United States Patent [19]

Miyamoto et al.

[11] Patent Number: 5,352,501
[45] Date of Patent: Oct. 4, 1994

[54] LONGITUDINAL MAGNETIC RECORDING MEDIUM COMPRISING A CIRCUMTERENTIALLY TEXTURED DISK SUBSTRATE, CHROMIUM PRIMER LAYER AND A COBALT CHROMIUM MAGNETIC ALLOY LAYER HAVING A SEGREGATION STRUCTURE

[75] Inventors: Yukihiro Miyamoto; Fumiaki Yokoyama, both of Yokohama, Japan

[73] Assignee: Mitsubishi Kasei Corporation, Tokyo, Japan

[21] Appl. No.: 631,904

[22] Filed: Dec. 21, 1990

[30] Foreign Application Priority Data

Dec. 27, 1989 [JP] Japan .................................. 1-338992

[51] Int. Cl.$^5$ ............................................. G11B 5/00
[52] U.S. Cl. ...................... 428/64; 428/336; 428/409; 428/611; 428/652; 428/667; 428/680; 428/694 T; 428/694 TS; 428/694 TP; 428/694 TR; 428/694 SG; 428/694 ST; 428/694 SL; 428/900; 428/928
[58] Field of Search ............... 428/694, 900, 611, 667, 428/64, 336, 409, 611, 652, 667, 680, 694 T, 694 TS, 694 TP, 694 TR, 694 SG, 694 ST, 694 SL, 928

[56] References Cited

U.S. PATENT DOCUMENTS

| | | | |
|---|---|---|---|
| 4,786,553 | 11/1988 | Shiroshi et al. | 428/336 |
| 4,789,598 | 12/1988 | Howard et al. | 428/408 |
| 4,792,497 | 12/1988 | Suzuki et al. | 428/336 |
| 4,808,489 | 2/1989 | Abe et al. | 428/336 |
| 4,902,583 | 2/1990 | Brucker et al. | 428/665 |
| 4,929,514 | 5/1990 | Natarajan et al. | 428/611 |

FOREIGN PATENT DOCUMENTS

| | | |
|---|---|---|
| 53770 | 11/1986 | Japan . |
| 255813 | 10/1988 | Japan . |
| 2071145 | 9/1981 | United Kingdom . |

OTHER PUBLICATIONS

Patent Abstracts of Japan, Unexamined applications P field, vol. 12, No. 243, Jul. 9, 1988 The Patent Office Japanese Government p. 91 P 728 *Kokai-No. 63-34 723 (Hitachi Metals LTD).

Patent Abstracts of Japan, Unexamined applications, P field, vol. 6, No. 203, Oct. 14, 1982 The Patent Office Japanese Government p. 37 P 148 *Kokai-No. 57-109 127 (Matsushita Denki Sangyo K.K.)*.

B. J. Langland, et al., IEEE Trans. Magn., MAG-17, No. 6, p. 2547, 1981 Recording on Perpendicular Anisotropy Media Whis Ring Head.

William G. Haines, J. Appl. Phys. 55, p. 2263, 1984 Effect of atomic distribution on the saturation magnetization of cobalt-chronium film.

E. M. Rossi, et al., J. Appl. Phys. 55, p. 2254, 1984 Vacuum-deposited thin-metal-film disk.

(List continued on next page.)

*Primary Examiner*—Stevan A. Resan
*Attorney, Agent, or Firm*—Oblon, Spivak, McClelland, Maier & Neustadt

[57] ABSTRACT

A longitudinal magnetic recording medium comprising a non-magnetic substrate having a texture with a arithmetric average roughness Ra in a circumferential direction of at least 20 Å and a magnetic alloy layer comprising cobalt and chromium as the main components, formed on the substrate, wherein the magnetic alloy layer has (i) a feature that when the orientation degree of the hcp crystal structure is represented by the diffraction ray intensity of electron diffraction by transmission electron diffractiometry, the intensity ratio of the electron diffraction ring in the Co (002) plane between the circumferential direction and the radial direction of the substrate is at least 3, and (ii) a segregation structure having low chromium concentration regions surrounded by high chromium concentration regions, the diameters of the defined low chromium concentration regions being within a range of from 80 to 500 Å, and the number of the surrounded low chromium concentration regions being from 600 to 1,500 regions/$\mu m^2$.

22 Claims, 15 Drawing Sheets

OTHER PUBLICATIONS

Y. Maeda, et al., Jpn. J. Appl. Phys. 24, L951, 1985 TEM Observation of Microstructure in Sputtered Co-Cr Film.

Y. Maeda, et al., Jpn. J. Appl. Phys. 25, L668, 1986 TEM Observation of Segragated Microstructure in Sputtered Co-Cr Film.

R. D. Fisher, et al., IEEE Trans. Magn. MAG-22, No. 5, p. 352, 1986 Magnetic Properties and Longiturdinal Recording Performance of Corrosion-Resistant Alloy Films.

Y. Maeda, et al., IEEE Trans. Magn. MAG-23, No. 5, p. 2061, 1987 Segregation in Sputtered Co-Cr Films.

J. C. Lin, et al., IEEE Trans. Magn., MAG-26, No. 1, p. 39, 1990 High Coercivity of CoCrTa on a Very Thin Cr Underlayer.

R. D. Fisher, et al., IEEE Trans. Magn., MAG-26, No. 1, p. 109, 1990 Effect of Substrate Bias on Crystalline Orientation of Chromium and Magnetic Characteristics of 84%Co-16% Films.

LONGITUDINAL MAGNETIC RECORDING MEDIUM COMPRISING A CIRCUMTERENTIALLY TEXTURED DISK SUBSTRATE, CHROMIUM PRIMER LAYER AND A COBALT CHROMIUM MAGNETIC ALLOY LAYER HAVING A SEGREGATION STRUCTURE

BACKGROUND OF THE INVENTION

1. Field of the Invention

The present invention relates to a longitudinal magnetic recording medium wherein information recording is conducted by magnetization in a longitudinal direction in the plane of the recording layer, which has magnetic properties remarkably improved.

2. Description of the Prior Art

In recent years, the application range of magnetic recording apparatus such as magnetic disc apparatus, flexible disc apparatus or magnetic tape apparatus has been remarkably expanded, and the importance of such magnetic recording apparatus has increased. Accordingly, for the magnetic recording media used in such apparatus, a remarkable improvement is being made in the recording density.

For such magnetic recording media, it is desired to attain a still higher recording density. For this purpose, the magnetic recording layer is required to have a high coercive force, and at the same time, the longitudinal magnetic recording medium wherein the magnetic recording is conducted in the circumferential direction of media, is required to have superior magnetic properties in the circumferential direction as compared with the properties in the radial direction of media.

As the magnetic layer for the longitudinal magnetic recording medium, a Co-Ni-Pt system and a Co-Ni, Co-Ni-Cr or Co-Cr system with a non-magnetic chromium primer layer are known. However, their coercive force is inadequate for high recording density media, and their magnetic properties in the recording direction are not good enough as compared with the properties in the traversed direction to the recording direction.

Further, in the summaries of reports presented at the 11th meeting of Japan Applied Magnetism Association, 18, 1987, it has been reported that the coercive force of a Co-Ni-Cr magnetic layer provided with a non-magnetic chromium primer layer, increases as the substrate temperature is raised. The reason for this is assumed to be the promotion of segregation of chromium to the crystal grain boundaries in the magnetic layer. However, this is only an assumption and is not confirmed. The segregation state of chromium changes depending upon the layer-forming conditions as described hereinafter. It is an important issue how the segregation state should be controlled to obtain desired magnetic properties of the longitudinal magnetic recording medium. Further, it is also an important question how to control the crystal orientation of the magnetic layer. However, in the above report, it has been reported that there is no change in the crystallizability. Furthermore, the necessity to raise the substrate temperature to a level of 290° C. limits the practical applicability in view of the required flatness of the substrate and the magnetization of the substrate.

It has been reported that in a perpendicular magnetic recording medium comprising Co and Cr as the main components, the precipitation state of Cr in the crystal grains gives a substantial influence over the magnetic properties, for example, in Jpn. J. Appl. Phys. 24 (1985) L951, and IEEE Trans. Mag. MAG-23 (1987) 2061. Namely, it has been reported that by the segregation of Cr, ferromagnetic high Co regions will be formed in a plate-like shape periodically within the crystal grains in a direction vertical to the magnetic recording layer, whereby the magnetic properties in the direction vertical to the plane of the magnetic layer, such as the coercive force in the vertical direction and the vertical magnetic anisotropy constant, will be remarkably improved. Further, Japanese Unexamined Patent Publication No. 255813/1988 discloses that it is possible to improve the vertical magnetic properties by adjusting the average period of the segregation regions to a level of from 30 to 300 Å. However, according to this mechanism, the (002) plane of cobalt crystals of the high cobalt concentration regions surrounded by high chromium concentration regions, is strongly oriented in the vertical direction by the plate-like segregation structure with the direction vertical to the plane of the magnetic layer being longitudinal, and the vertical magnetic anisotropy is created by the multiplication of the shape magnetic anisotropy by the plate-like structure.

Although such a chromium segregation structure may be optimum for vertical magnetic recording media, it is not suitable for longitudinal magnetic recording media, since the magnetization direction is different from the longitudinal magnetic recording media, and the magnetic properties in the longitudinal direction deteriorate.

Further, Japanese Examined Patent Publication No. 53770/1986 discloses that in a vertical magnetic recording medium comprising Co and Cr, or Co, Cr and Ni as the main components, the corrosion resistance can be improved by segregating Cr at the surface of crystals of the magnetic layer. However, this is also an invention for vertical magnetic properties, which are unsuitable for a longitudinal magnetic recording medium.

Further, in order to improve the magnetic properties in the recording direction, it has been attempted to impart a good magnetic anisotropy in the circumferential direction of a disc medium by forming a magnetic layer on a substrate having a texture in the circumferential direction. However, the effects are not remarkable within the range of practical surface roughness. In order to impart a remarkable magnetic anisotropy, a substrate having a texture in the circumferential direction is used, and a magnetic layer is formed by oblique incidence while rotating the substrate, as reported in J. Appl. Phys. 55 (1984) 15. However, this method is not suitable for mass production of the product.

Thus, a chromium segregation structure suitable for a longitudinal magnetic recording medium to obtain a high coercive force has not yet been known, and there has been no practical means to improve the magnetic properties in the direction of recording.

SUMMARY OF THE INVENTION

The present inventors have found that when a magnetic alloy layer comprising cobalt and chromium as the main components is used as a longitudinal magnetic recording medium, in order to obtain the optimum magnetic properties, it is not sufficient to merely segregate chromium or to employ an axis of easy magnetization of magnetic layer merely oriented in-plane, and it is important to minutely control the segregation state of chromium to obtain a high coercive force and to control the orientation of crystallites to impart a magnetocrystalline anisotropy excellent in a specific direction, and for that purpose, it is important to control the nature of the substrate on which the magnetic layer is formed. The present invention is based on this discovery.

Thus, the present invention provides a longitudinal magnetic recording medium comprising a non-magnetic substrate having a texture with a arithmetric average roughness Ra (deviation from center line) in a circumferential direction of at least 20 Å and a magnetic alloy layer comprising cobalt and chromium as the main components, formed on the substrate, wherein the magnetic alloy layer has (i) a feature that when the crystalline orientation degree of the hcp crystal structure is represented by the diffraction ray intensity of electron diffraction by transmission electron diffractiometry, the intensity ratio of the electron diffraction ring in the Co (002) plane between the circumferential direction and the radial direction of the substrate is at least 3, and (ii) a segregation structure having low chromium concentration regions surrounded by high chromium concentration regions, the diameters of the surrounded low chromium concentration regions being within a range of from 80 to 500 Å, and the number of the surrounded low chromium concentration regions being from 600 to 1,500 regions/$\mu m^2$. It is thereby possible to obtain a high coercive force and a magnetic anisotropy excellent in the circumferential direction of the disc.

Now, the present invention will be described in further detail with reference to the preferred embodiments.

DETAILED DESCRIPTION OF THE INVENTION

Figure 1:
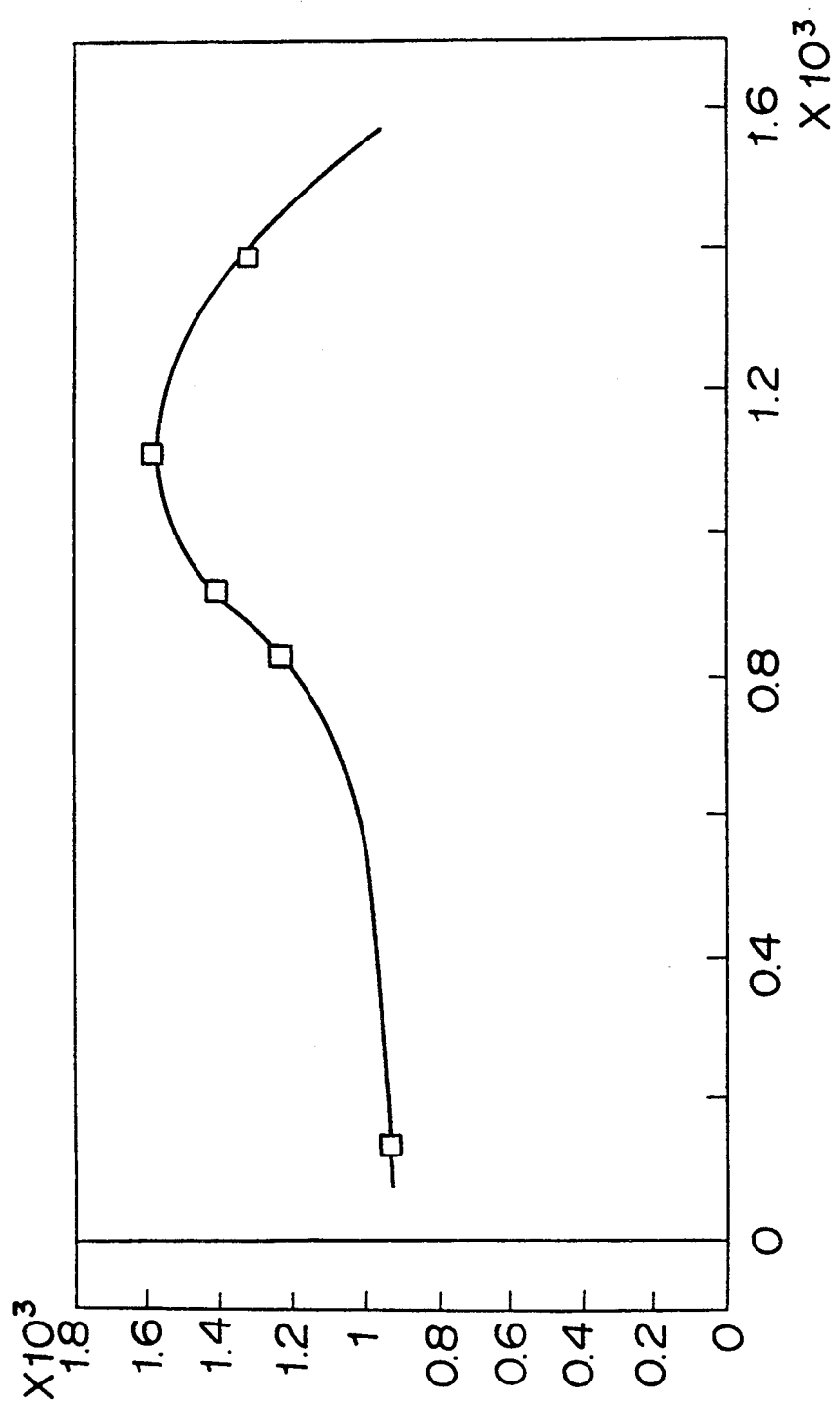
FIG. 1 is a graph showing the relation between the number of the surrounded low chromium concentration regions and the coercive force Hc obtained in Examples 1 to 4 and Comparative Example 1.

The longitudinal magnetic recording medium of the present invention comprises a non-magnetic substrate having a texture with a arithmetric average roughness Ra in a circumferential direction of at least 20 Å and a magnetic alloy layer comprising cobalt and chromium as the main components, formed on the substrate, wherein the magnetic alloy layer has (i) a feature that when the crystalline orientation degree of the hcp crystal structure is represented by the diffraction ray intensity of electron diffraction by transmission electron diffractiometry, the intensity ratio of the electron diffraction ring in the Co (002) plane between the circumferential direction and the radial direction of the substrate is at least 3, and (ii) a segregation structure having low chromium concentration regions surrounded by high chromium concentration regions, the diameters of the surrounded low chromium concentration regions being within a range of from 80 to 500 Å, and the number of the surrounded low chromium concentration regions being from 600 to 1,500 regions/$\mu m^2$.

In order to obtain a magnetic anisotropy excellent in the circumferential direction of the disc, the present inventors have formed by sputtering a non-magnetic primer layer containing chromium as the main component by employing disc substrates provided with various textures in the circumferential direction and then formed a Co-Cr alloy magnetic layer thereon by sputtering. They have studied the discs thus prepared, whereby it has been found that in order to obtain a good magnetic anisotropy, the substrate is required to have a texture with a surface roughness of at least 200 Å as the center line average roughness Ra of the substrate. On the other hand, if the arithmetric average roughness Ra is increased, a danger of head crash i.e. the collision of the head and the disc increases, and such attempt tends to be impractical.

The present inventors have further studied the mechanism of the development of the magnetic anisotropy and as a result, have found that there is a distinct relation between the orientation of crystallites and the magnetic anisotropy.

Namely, it has been found that a magnetic alloy layer comprising cobalt and chromium as the main components takes a hcp crystal structure, and its axis of easy magnetization is in the (002) direction, and that when the intensity ratio between the circumferential direction and the radial direction of the diffraction ring in the (002) plane of the transmission electron beam diffraction is at least 3, preferably at least 5, more preferably at least 7, an excellent magnetic anisotropy in the circumferential direction can be obtained even without employing the effects of the shape anisotropy by oblique incidence as described in the above-mentioned J. Appln. Phys. 55 (1984) 15. At the same time, the texture imparted to the non-magnetic substrate is adjusted so that the central average roughness Ra in the circumferential direction is at least 20 Å, preferably from 30 to 300 Å, more preferably from 50 to 300 Å, whereby an even better electron beam diffraction intensity ratio will be given. Here, the texture in the circumferential direction means that the majority of texture is aligned in the circumferential direction.

As a method for changing the crystal orientation of the magnetic cobalt alloy layer, e.g. Journal Electro Communication Society CPM 85-108.9 (1985) reports that when a perpendicular magnetic layer of Co-Cr alloy is formed by sputtering, if the sputtering is conducted under application of a bias voltage to the substrate, the orientation in the Co (002) plane of crystals will be improved in parallel with the plane of the magnetic layer. However, for the longitudinal magnetic recording medium, it is necessary to orient the Co (002) plane of the crystals perpendicular to the plane of the magnetic layer, and such is not yet sufficient to obtain an adequate magnetic anisotropy. Namely, it is also necessary to orient the crystals so that the axis of easy magnetization is aligned in the recording direction.

The axis of easy magnetization of a magnetic cobalt alloy layer taking a hcp structure is the C axis. To measure the orientation of the C axis parallel to the magnetic layer, it is preferred to measure the intensity of the diffraction ring in the Co (002) plane by transmission electron diffractiometry.

The ratio of the crystal orientation degrees can be obtained by observing the magnetic layer by a transmission electron microscope and the diffraction pattern by electron diffractiometry, obtaining the blackening degrees with respect to the circumferential direction (textured direction) and the radial direction of the diffraction ring in the Co (002) plane from the respective quantities of light transmittance, and comparing the blackening degrees.

In the present invention, by the specific chromium segregation structure, it is possible to obtain a high coercive force and a magnetic anisotropy excellent in the circumferential direction of the disc.

Namely, it is a segregation structure wherein low chromium concentration regions are surrounded by high chromium concentration regions. In the segregation structure, the diameters of the surrounded low chromium concentration regions are within a range of from 80 to 500 Å, and the number of the surrounded low chromium concentration regions is from 600 to 1,500 regions/$\mu m^2$.

With respect to the high chromium concentration regions and the surrounded low chromium concentration regions, chromium in the high chromium concentration regions is considered to be at least 30 atomic % from the compositional proportions obtained by EDX (energy dispersion type X-ray spectroscope) analysis, and the high chromium concentration regions are considered to be in a non-magnetic state from a published literature such as IEEE Trans. Mag. MAG-14 (1978) 849. Accordingly, the segregation structure of the present invention is considered to be in a state where ferromagnetic regions are enclosed by non-magnetic regions. The difference in the composition between the high chromium concentration regions and the low chromium concentration regions can not simply be defined due to e.g. the difference in the magnetic properties of the respective regions and a problem in the analytical precision. However, in general, it is preferred that the high chromium concentration region is non-magnetic i.e. at least about 30 atomic %, and the composition of low chromium concentration region is a ferromagnetic composition i.e. at most about 25 atomic %. However, it is believed that even if the high chromium concentration regions are not non-magnetic, if there is a difference of about 5 atomic % in the amount of chromium, the magnetic anisotropic energy increases due to the difference in the degree of spontaneous magnetization, and consequently the coercive force increases.

The width of the high chromium concentration regions is from about 2 to 5 nm. Further, if the number of the surrounded low chromium concentration regions is less than 600 regions/$\mu m^2$, no adequate effect for increasing the coercive force will be obtained, and if it exceeds 1,500 regions/$\mu m^2$, no further effect for improving the coercive force will be obtained. Therefore, the number of the low chromium concentration regions are usually from 600 to 1,500 regions/$\mu m^2$, preferably from 800 to 1,500 regions/$\mu m^2$. The diameters of the low chromium concentration regions are within a range of from about 80 to 500 Å. If the diameters are outside this range, the coercive force tends to be low.

There is no particular restriction as to the concentration of Cr in the alloy magnetic layer. However, when the concentration is at least 6 atomic % relative to Co, the formation of high chromium concentration regions becomes distinct. Therefore, the concentration of Cr is preferably within a range of from 6 to 25 atomic %.

Other elements such as Ta, Nb, Pt, Pd, Ni, Zr, W, Mo and Hf may be added to Co and Cr. The amount of such additional elements is usually less than 10 atomic %, preferably less than 6 atomic %, relative to Co and Cr.

The segregation structure of the high chromium concentration regions and low chromium concentration regions may be analyzed, for example, by the following method.

Namely, the magnetic layer is peeled from the substrate by means of e.g. an aqueous hydrochloric acid solution and immersed in e.g. dilute aqua regia to selectively elute the low chromium concentration regions, whereupon a photograph is taken by a transmission electron microscope. The photograph is subjected to suitable image treatment to make the contrast between the low chromium concentration regions and the high chromium concentration regions distinct. Then, the number of the low chromium concentration regions surrounded by the high chromium concentration regions is counted.

The diameter of the low chromium concentration region is obtained from the surface area of the surrounded low chromium concentration region by calculation as the diameter of a circle with the area.

So long as such a magnetic layer can be formed, there is no particular restriction as to the layer-forming method to obtain a magnetic recording medium provided with a magnetic layer having the above mentioned crystal orientation and properties. Formation of such a magnetic layer can be controlled by adjusting the surface morphology of the substrate, the composition of the magnetic layer and the layer-forming conditions. One embodiment of the layer-forming method will be described below.

With respect to the non-magnetic substrate, there is no particular restriction. It is common to employ an aluminum alloy plate having a nickel-phosphorus layer formed by electroless plating. However, it is also possible to employ other substrates such as a metal substrate of e.g. Cu or Ti, a glass substrate, a ceramic substrate or a resin substrate. On such a non-magnetic substrate, a texture with a arithmetric average roughness of 20 Å is formed in a circumferential direction. Then, a non-magnetic primer layer containing Cr as the main component (hereinafter sometimes referred to as "Cr primer layer") is formed by sputtering in a layer thickness of from 500 to 2,000 Å. Then, a magnetic alloy layer comprising Co and Cr as the main components is formed by sputtering.

The sputtering system may be a direct current magnetron sputtering method or a high frequency magnetron sputtering method.

For forming a magnetic alloy layer, sputtering is conducted while applying a bias voltage so that the substrate would be relatively negative to the plasma potential, whereby a magnetic layer having the above mentioned crystal orientation and properties can be formed satisfactorily. Application of the bias voltage may be conducted also for the formation of the Cr primer layer. The degree of the bias voltage varies depending upon the structure of the sputtering apparatus. However, it is usually from 40 to 400 V, preferably from 50 to 250 V. For the application of the bias voltage, either a method wherein the substrate potential is made negative to the ground potential, or a method wherein the plasma potential is made higher than the ground potential while maintaining the substrate at a level of the ground potential, may be used. For example, an intermediate electrode may be provided in the plasma region in the vicinity of the target, and layer-forming may be conducted by sputtering under such a condition that a positive potential, for example, a potential of from 40 to 400 V, preferably from 50 to 250 V, is applied to the non-magnetic substrate and the grounding portion of the sputtering apparatus. The pressure during the sputtering is adjusted to be not higher than the initially accomplished vacuum degree of $3 \times 10^{-6}$ Torr, practically from $1 \times 10^{-3}$ Torr to $20 \times 10^{-3}$ Torr so as to obtain a constant plasma state. Further, the substrate temperature during the layer-forming is preferably adjusted within a range of from 140° to 270° C., particularly from 200° to 270° C., in order to increase the coercive force.

When formation of the magnetic layer is conducted in an argon atmosphere and a bias voltage is applied, argon tends to be included in the magnetic layer. The amount will be from about 0.2 to 1.5 atomic %, which is larger than the case where sputtering is conducted without applying the bias voltage.

The thickness of the magnetic layer may optionally be determined depending upon the properties required for the magnetic recording medium. Usually, the thickness is preferably from 300 to 1,500 Å.

For the practical use of the magnetic recording medium of the present invention, it is preferred to form on the magnetic layer a protective layer of e.g. a carbon material or an oxide such as $SiO_2$ or $ZrO_2$ having a thickness of from 100 to 500 Å and, if necessary, further form a fluorine type or aliphatic type liquid or solid lubricant layer having a thickness of from 5 to 50 Å, to provide excellent durability and corrosion resistance.

Now, the present invention will be described with reference to Examples. However, it should be understood that the present invention is by no means restricted to such specific Examples.

In the following Examples, the intensity ratio (crystal orientation) between the circumferential direction and the radial direction of the electron diffraction rays of the magnetic layer, was measured in accordance with the following method.

The magnetic layer was subjected to limited area electron beam diffraction by means of a transmission electron microscope (H-9000NA, manufactured by Hitachi, Ltd., acceleration voltage:300 KV) and studied. For the diffraction, a selected area diffraction was used, and the diffraction pattern of a region of 5 μm in diameter was photographed on a film with a camera length of 1.0 m. The exposure time was adjusted within a range in which the blackening degree of the diffraction ring was in a linear relation with the exposure time, and the blackening degree of the diffraction ring was obtained by scanning the negative by a microphotometer (JMD-2C Model, manufactured by Nippon Denshi K. K., slit: 500 μm×100 μm) with a light spot of 500 μm×100 μm to obtain a light transmittance and calculating the blackening degree by the following formula (I)

$$D = \log (1/T) \qquad (I)$$

where D is the blackening degree, and T is the light transmittance.

Figure 6:
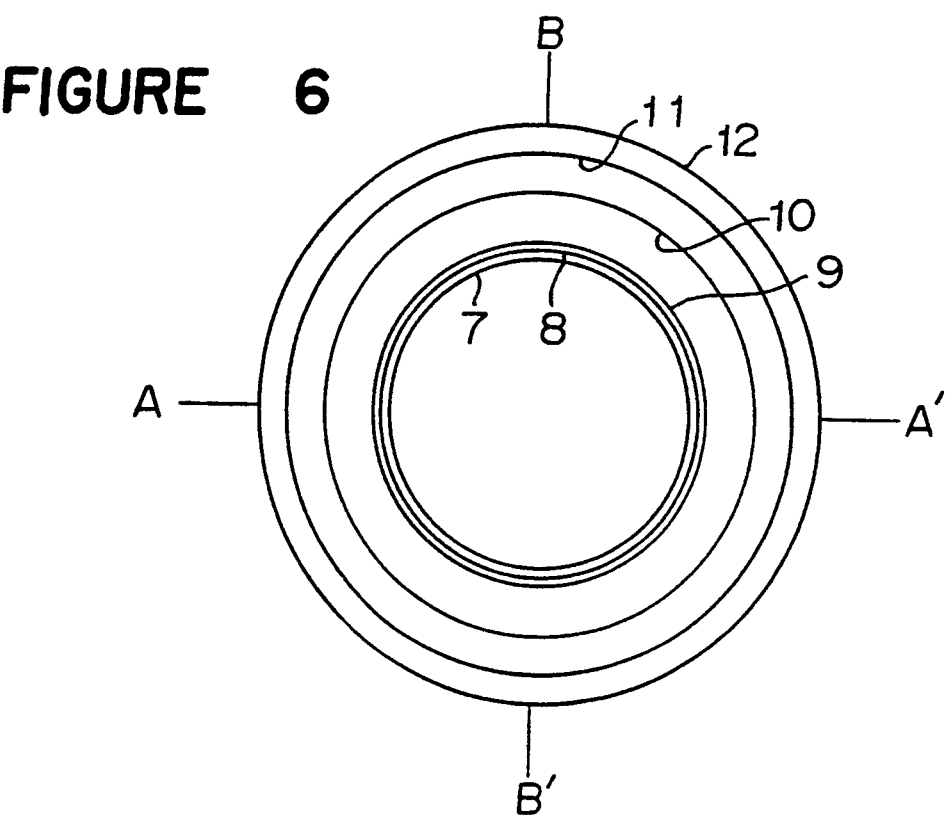
FIG. 6 is a view illustrating the positional relation between the respective diffraction rings by transmission electron diffraction and cobalt crystal orientation planes, wherein A-A' line indicates the circumferential direction (textured direction) of the substrate, B-B' line indicates the radial direction of the substrate, reference numeral 7 indicates diffraction rays in the (100) plane, numeral 8 indicates diffraction rays in the (002) plane, numeral 9 indicates diffraction rays in the (101) plane, numeral 10 indicates diffraction rays in the (102) plane, numeral 11 indicates diffraction rays in the (110) plane, and numeral 12 indicates diffraction rays in the (103) face.
Figure 7:
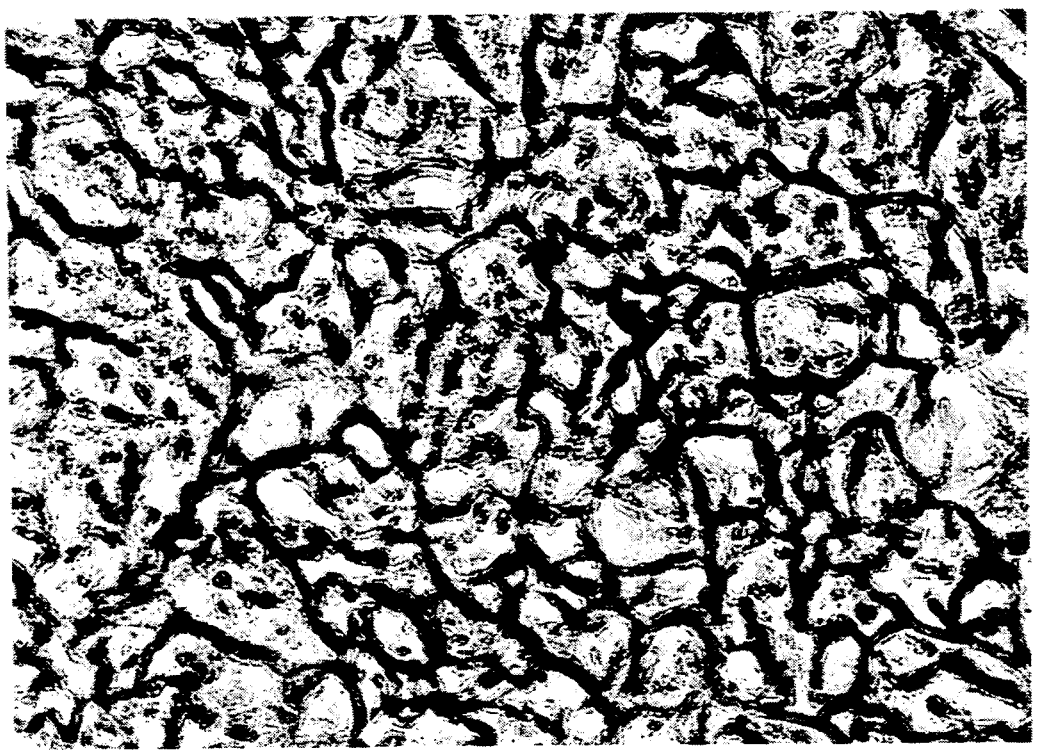
FIGS. 7 to 11 are transmission electron microscopic photographs showing the chromium segregation structures of the magnetic layers of Examples 1 to 4 and Comparative Example 1. The magnification is 400,000 times.
Figure 8:
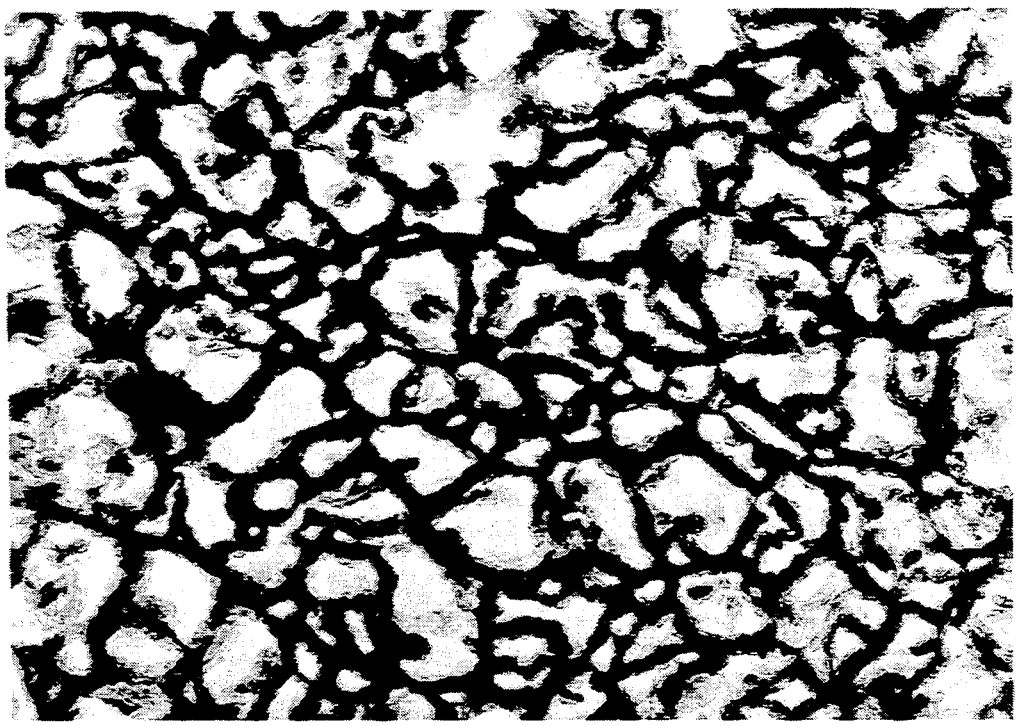
Figure 9:
Figure 10:
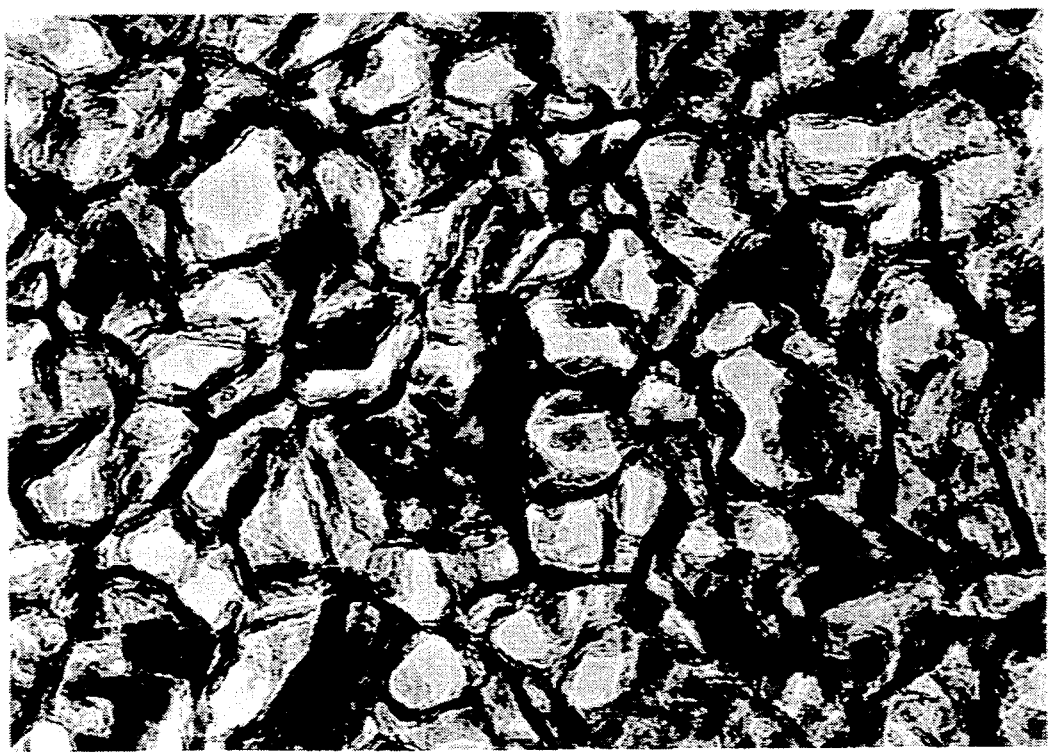
Figure 11:
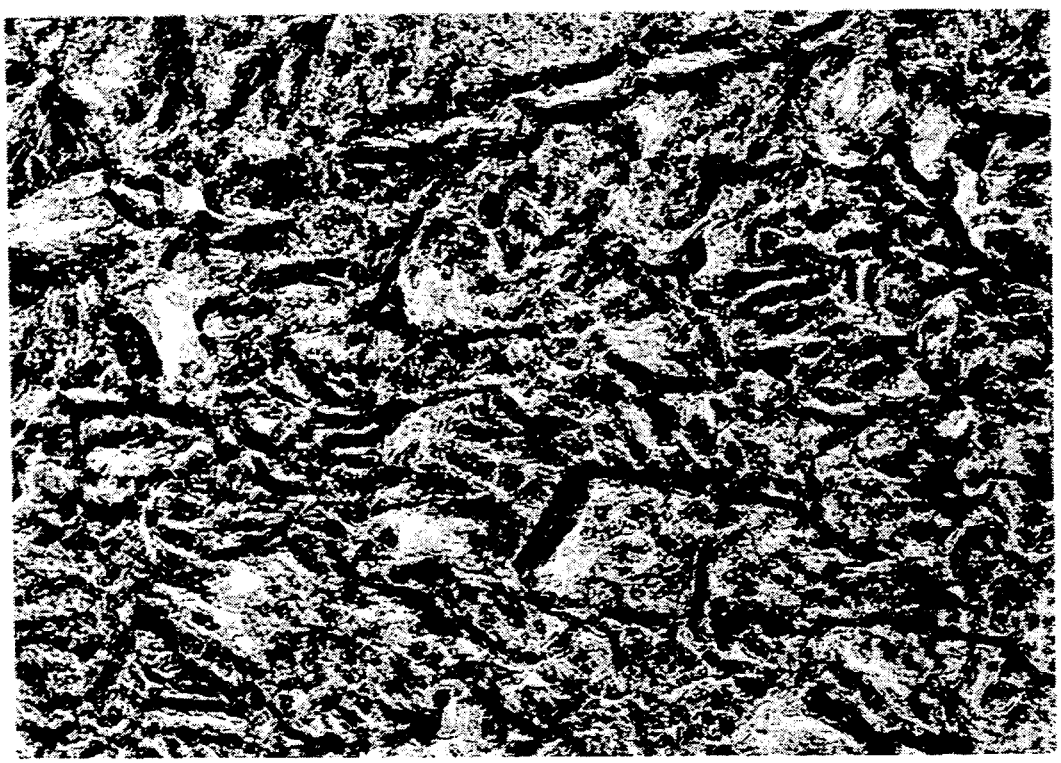
Figure 12:
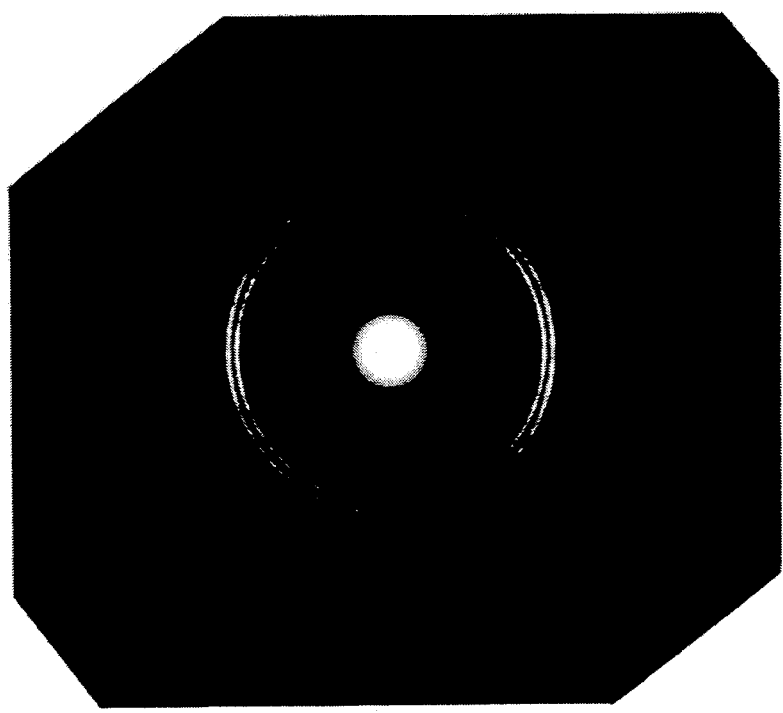
FIG. 12 is a transmission electron microscopic photograph showing the microstructure of the magnetic layer in Example 5, wherein C-C' line indicates a circumferential direction (textured direction) of the substrate. The magnification is 400,000 times.
Figure 13:
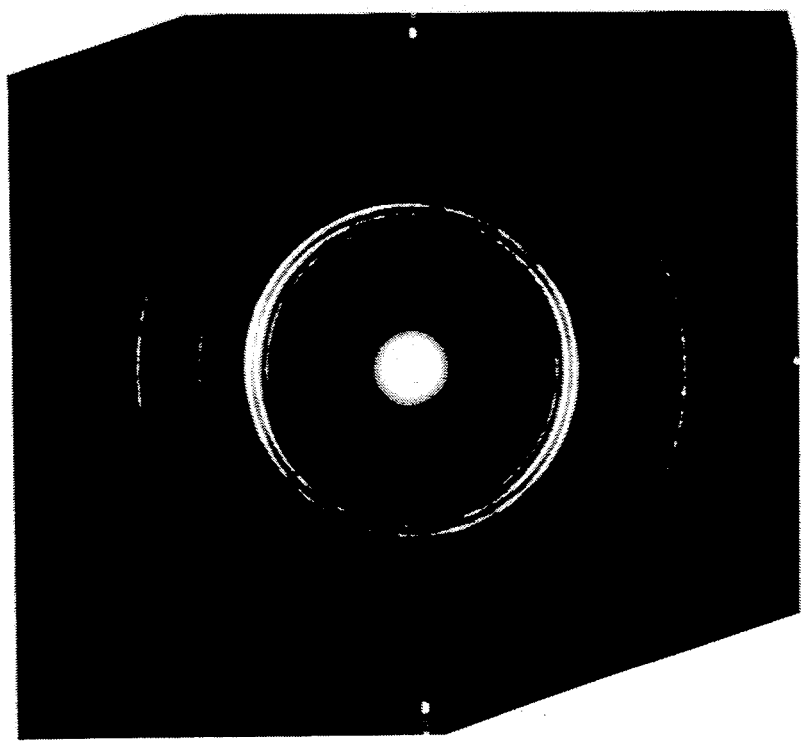
FIG. 13 is a transmission electron microscopic photograph showing the microstructure of the magnetic layer of Example 6, wherein D-D' line indicates the circumferential direction (textured direction) of the substrate. The magnification is 400,000 times.
Figure 14:
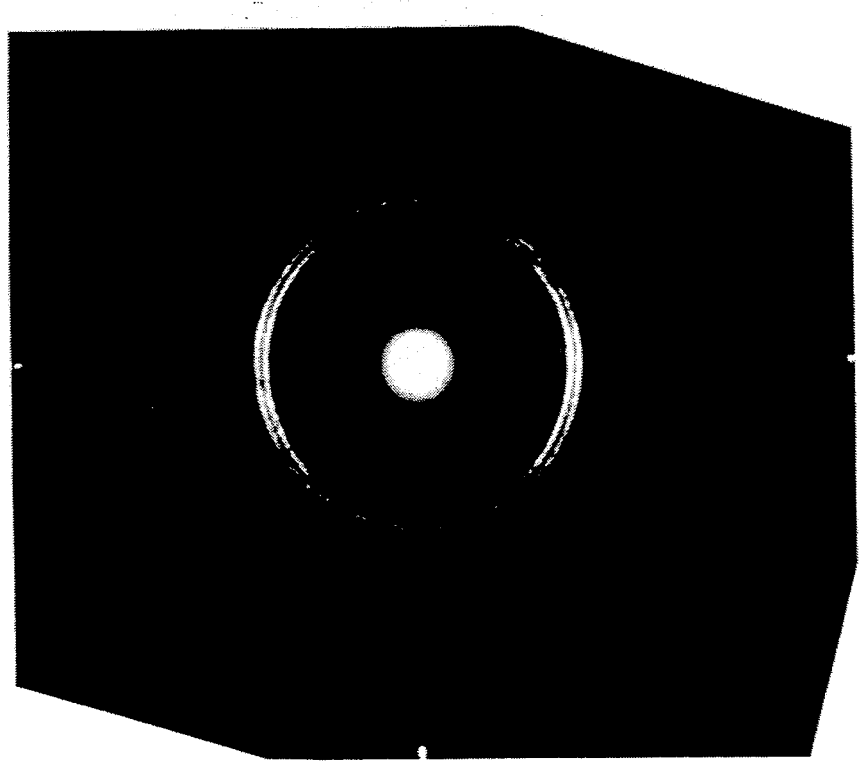
FIG. 14 is a transmission electron microscopic photograph showing the microstructure of the magnetic layer of Example 7, wherein E-E' line is a circumferential direction (textured direction) of the substrate. The magnification is 400,000 times.
Figure 15:
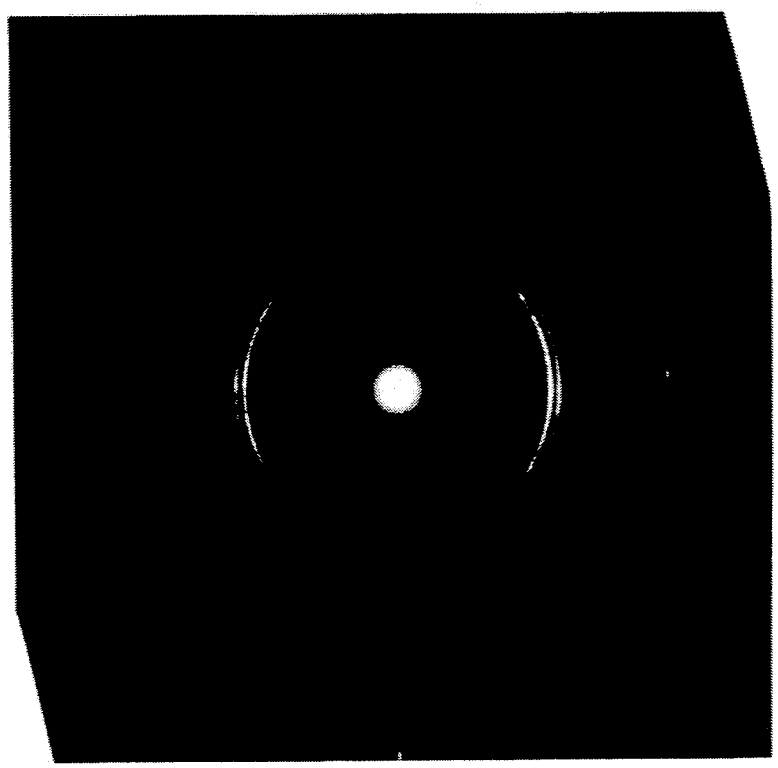
FIG. 15 is a transmission electron microscopic photograph showing the microstructure of the magnetic layer of Example 8, wherein F-F' line represents the circumferential direction (textured direction) of the substrate. The magnification is 400,000 times.
Figure 16:
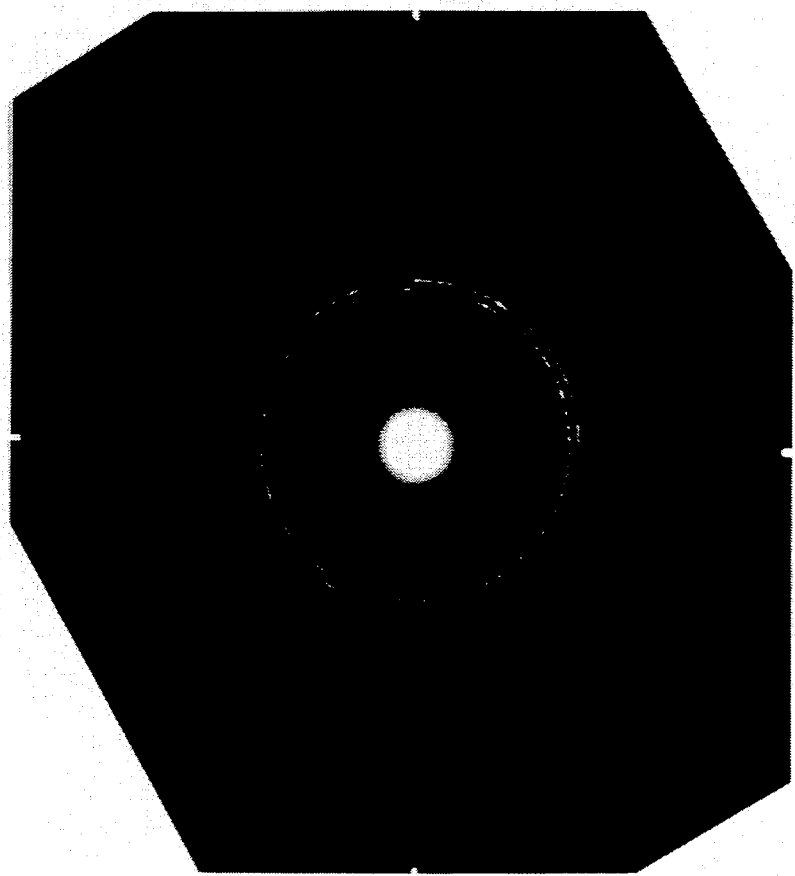
FIG. 16 is a transmission electron microscopic photograph showing the microstructure of the magnetic layer of Comparative Example 3, wherein G-G' line represents the circumferential direction (textured direction) of the substrate. The magnification is 400,000 times.
Figure 1:
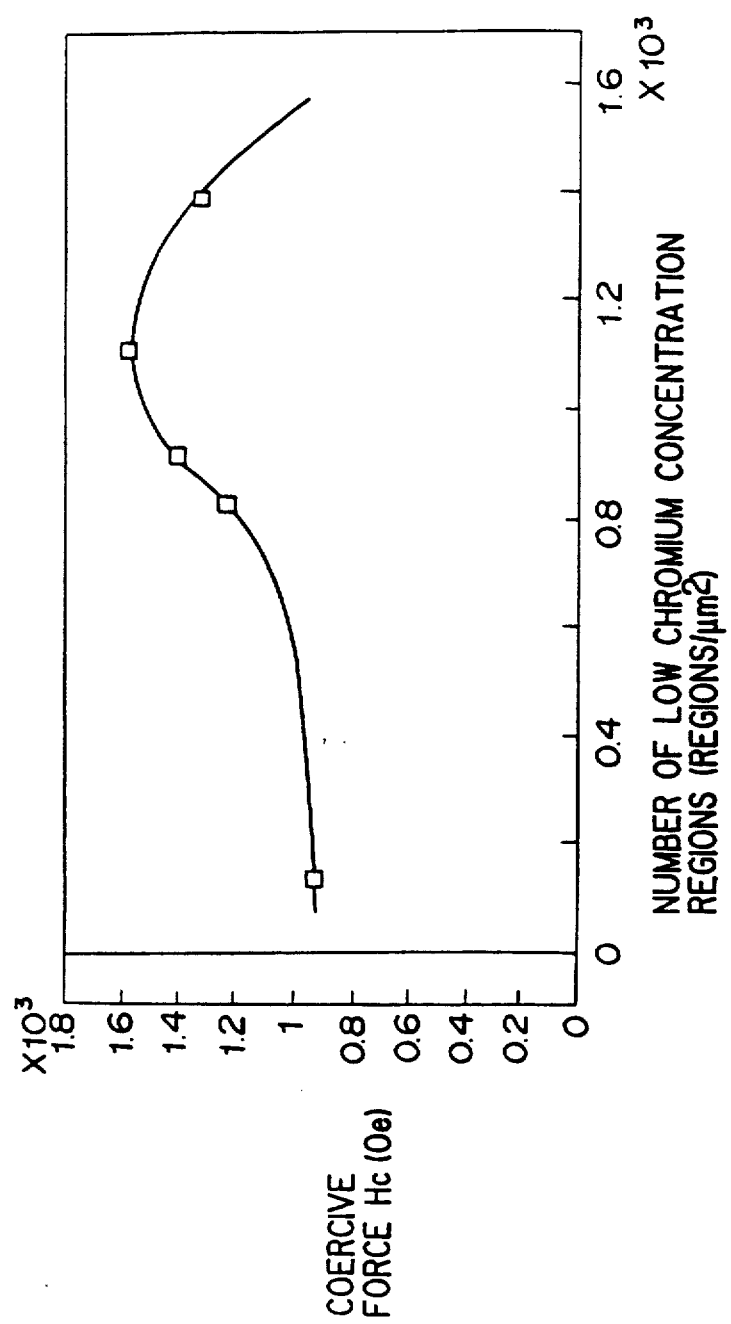
Figure 2:
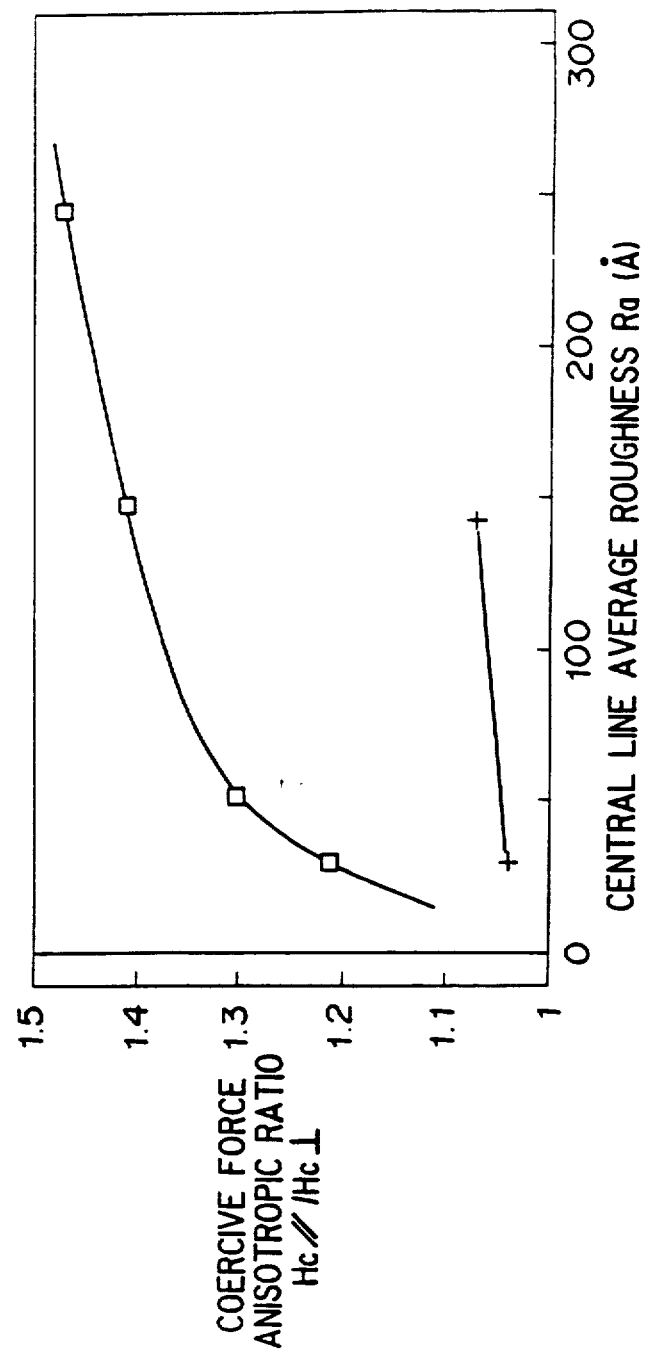
Figure 3:
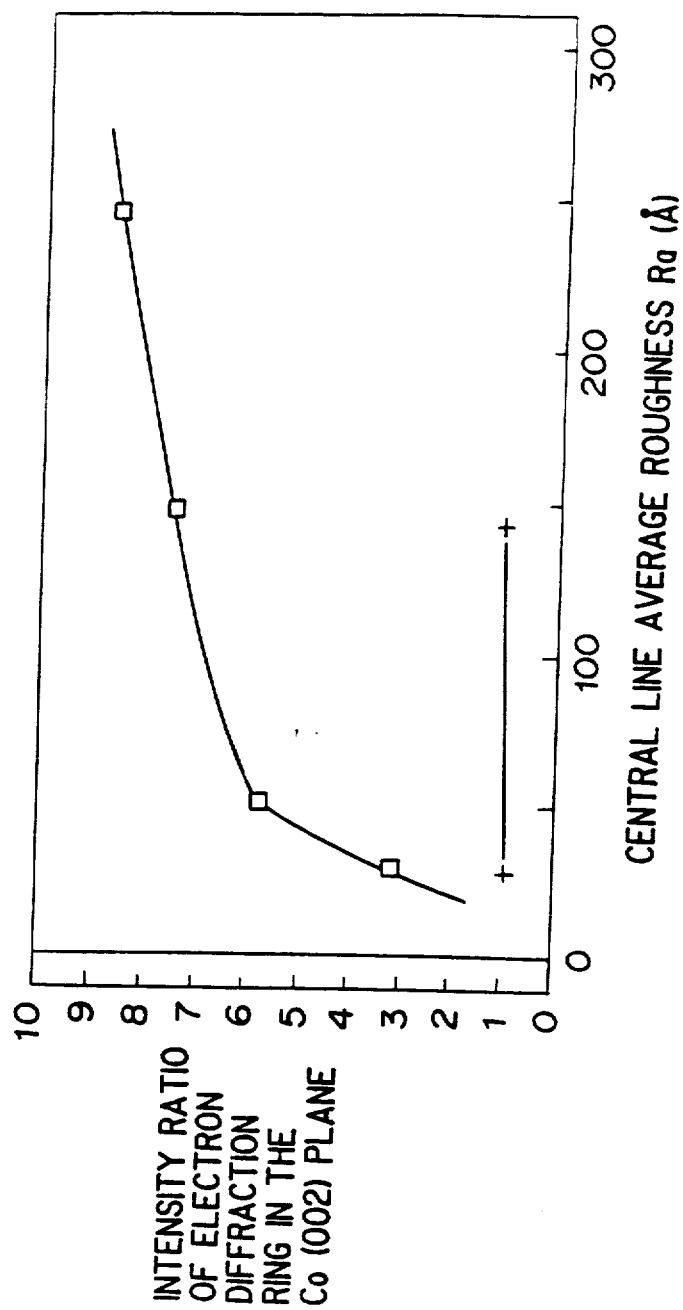
Figure 4:
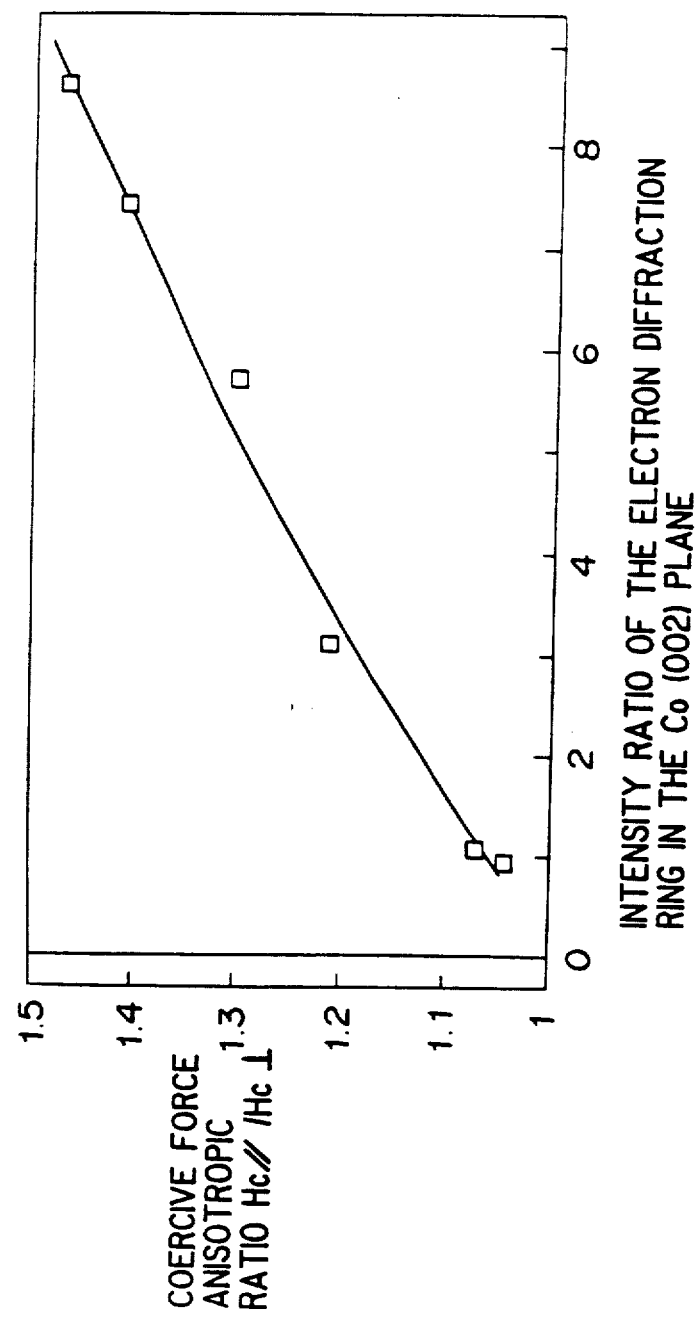
Figure 12:
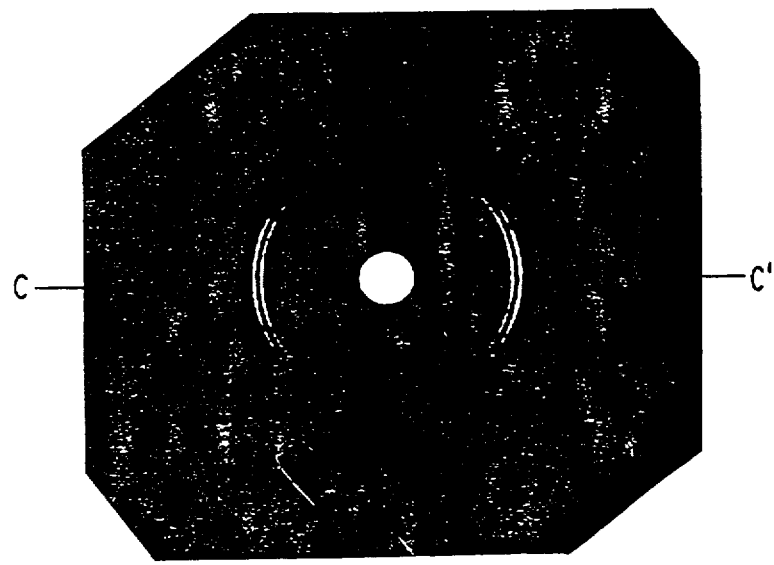
Figure 13:
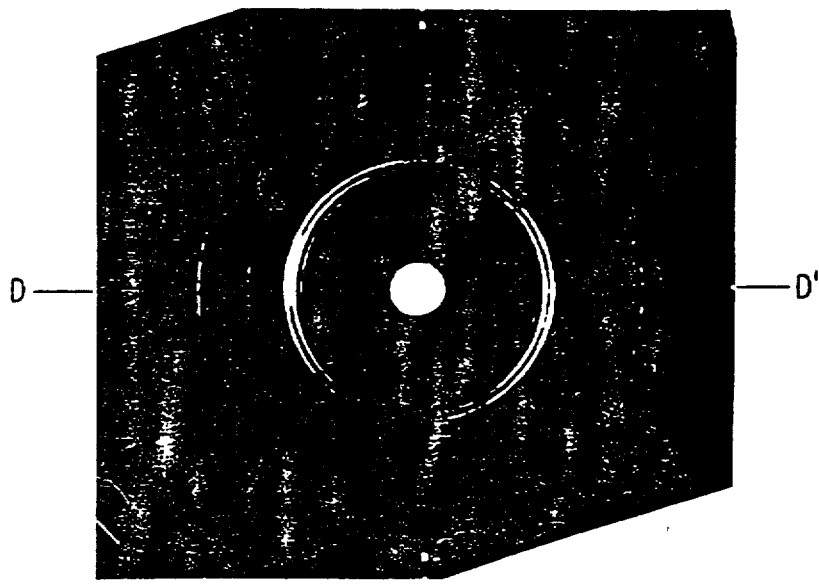
Figure 14:
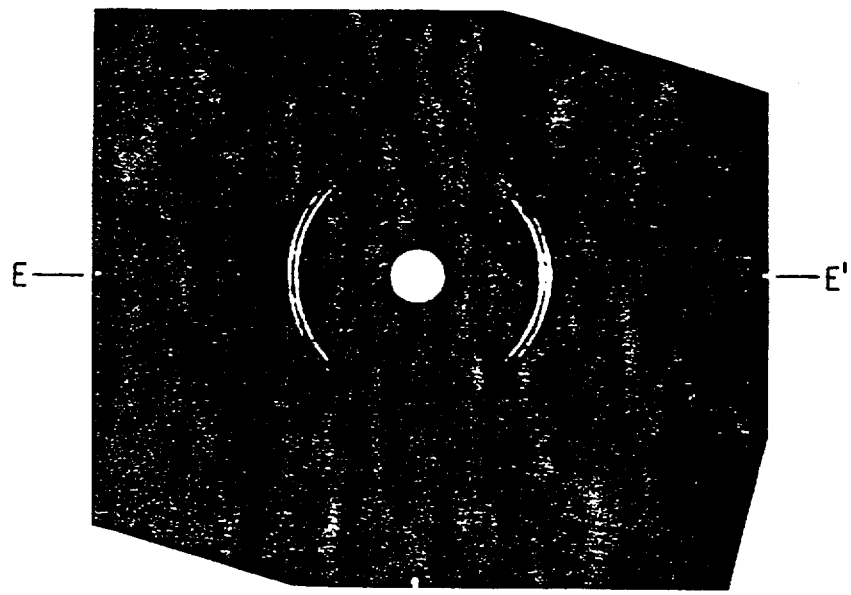
Figure 15:
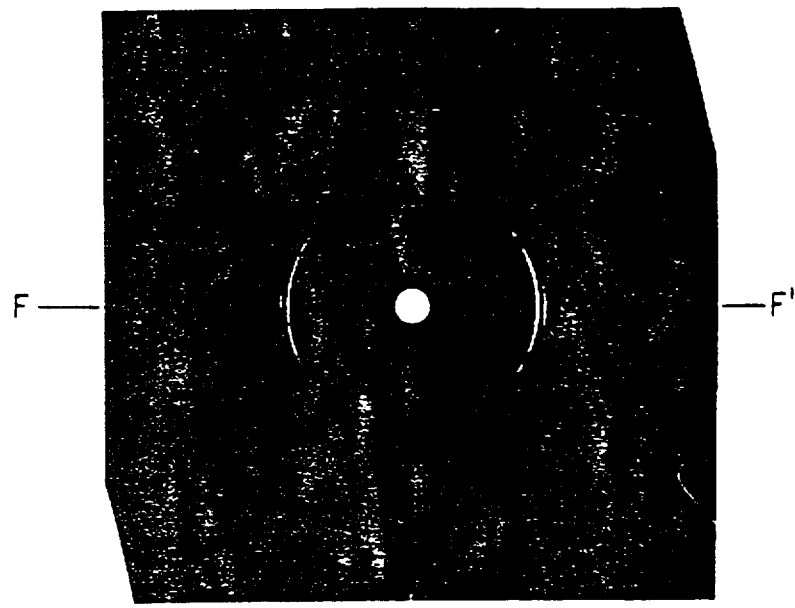
Figure 16:
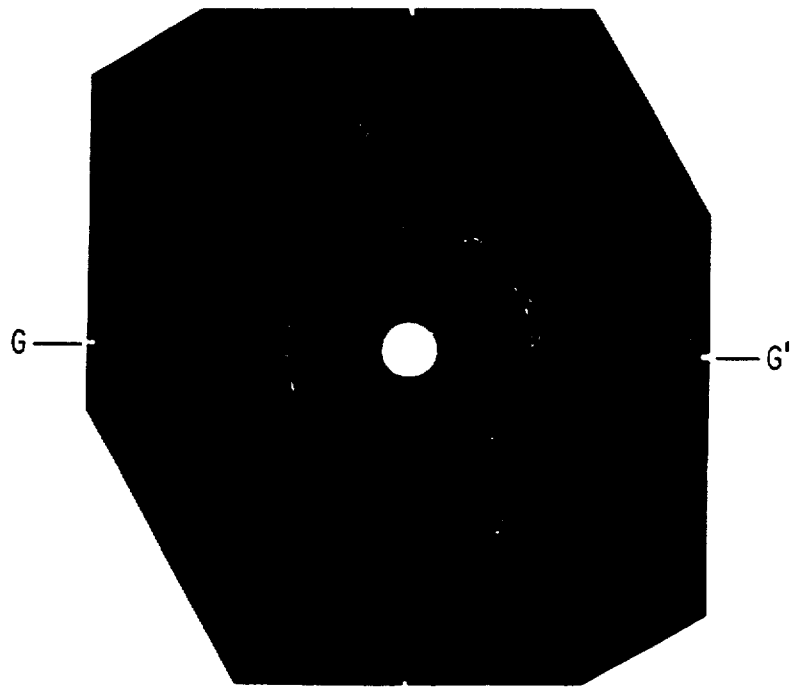

The intensity ratio is the ratio of the blackening degree in the circumferential direction (i.e. the textured direction) of the diffraction ring in the Co (002) plane to the blackening degree in the radial direction thereof. Namely, the positional relation between the diffraction rings by the above transmission electron diffraction and the Co crystal planes is as shown in FIG. 6. Referring to FIG. 6, the ratio of the blackening degree at the intersection of the A-A' line (circumferential direction) and the diffraction ring 8 to the blackening degree at the intersection of the B-B' line (radial direction) and the diffraction ring 8, was obtained. As the film for the electron diffraction, film FG-ORTHOCHROMATIC for electron microscope, manufactured by Fuji Photo Film Co., Ltd. was used. The exposure time was within a range from 0.5 to 3 seconds in which the exposure time was in a linear relation with the blackening degree.

Further, the chromium segregation structure of the magnetic layer was examined by the following method.

The number of the low chromium concentration regions surrounded by the high chromium concentration regions per unit area was obtained by peeling the magnetic layer with an aqueous solution of 35 wt % hydrochloric acid/water in a ratio of 15 ml/100ml, then immersing it for 30 hours in dilute aqua regia prepared by diluting a 1:1 mixture of 0.75N nitric acid and 6N hydrochloric acid with water to 1/16, to selectively elute the low chromium concentration regions, then photographing the magnetic layer directly by a transmission electron microscope under 100,000 magnifications, enlarging the photograph to 400,000 times, and then subjecting this transmission electron microscopic photograph to image processing.

The image processing method was conducted in such a manner that taking 50% of the difference in contrast between the high chromium concentration regions (black) and the low chromium concentration regions (white) as the slice level, a two-value image was prepared, spot-like high chromium concentration regions of less than 50 nm² were removed as background, and then broken lines of less than 10 nm of the high chromium concentration regions enclosing the low chromium concentration regions were corrected as if the high chromium concentration regions were continuous. The length of 10 nm was not more than 10% of the average circumferential length of the surrounded low chromium concentration regions. In this manner, the number of the low chromium concentration regions surrounded by the high chromium concentration regions was counted. The diameter of the low chromium concentration region was calculated from the area of the surrounded low chromium concentration region as the diameter of a circle. An average value of the diameters of the low chromium concentration regions within an area of 0.5 μm×0.5 μm randomly observed, was also obtained.

EXAMPLES 1 TO 4 AND COMPARATIVE EXAMPLE 1

On an aluminum alloy disc substrate having an inner diameter of 25 mm and an outer diameter of 95 mm, a non-magnetic Ni-P layer was plated in a thickness of 25 μm by electroless plating, and its surface was polished to a mirror surface and then subjected to texturing in a arithmetric average roughness Ra of 140 Å (as measured in accordance with JIS B0601, the same applied hereinafter) in a circumferential direction. The roughness was measured by a stylus type roughness meter (Rank Taylor Hobson Ltd., 112/1037, Taly step, stylus shape:0.2 μm×0.2 μm) in a radial direction.

Figure 5:
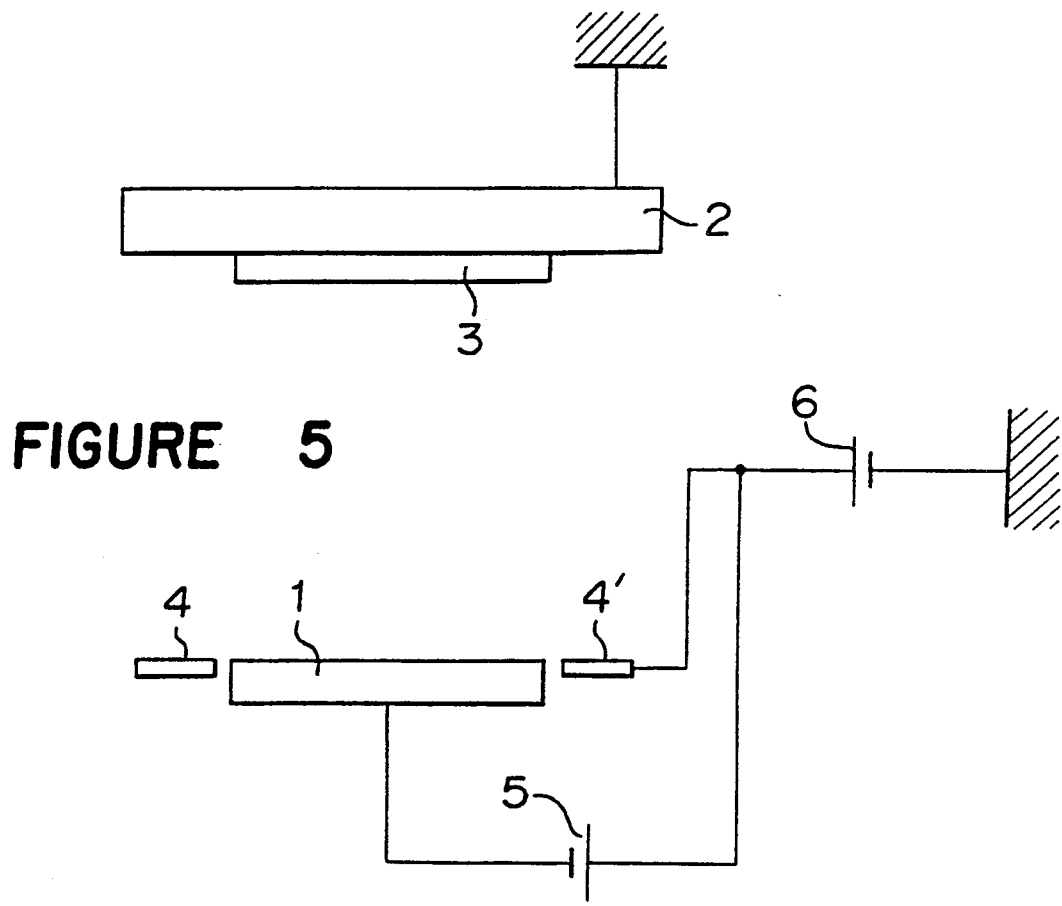
FIG. 5 is a schematic view illustrating an embodiment of a sputtering apparatus suitable for obtaining a longitudinal magnetic recording medium of the present invention, wherein reference numeral 1 indicates a target, numeral 2 indicates a substrate holder, numeral 3 indicates a substrate, numerals 4 and 4' indicate intermediate electrodes, numeral 5 indicates a power source for sputtering, and numeral 6 indicates a power source for the intermediate electrodes.

This non-magnetic substrate was mounted in a high frequency (13.56 MHz) magnetron sputtering apparatus, and after evacuating the apparatus to a level of $1\times10^{-6}$ Torr, the substrate was heated to a temperature of 210° C., argon gas was introduced to a level of $5\times10^{-3}$ Torr, and a chromium layer was formed in a thickness of 1,500 Å with a power of 8.8 W/cm². Then, a $Co_{84}Cr_{16}$ magnetic layer was formed in a thickness of 700 Å. The electrode arrangement for the sputtering apparatus was as shown in FIG. 5. FIG. 5 is a schematic view of the sputtering apparatus, wherein reference numeral 1 indicates a target, numeral 2 indicates a substrate folder, numeral 3 indicates the substrate, numerals 4 and 4' indicate intermediate electrodes, numeral 5 indicates a power source for sputtering, and numeral 6 indicates a power source for the intermediate electrodes. Namely, the intermediate electrodes 4 and 4' were provided in the vicinity of the outer circumference of a target 1, and sputtering was conducted by applying a positive voltage to the intermediate electrodes relative to the substrate 3 to increase the plasma potential so that the potential of the substrate 3 became negative relative to the plasma potential. In Examples 1 to 4, layer-forming was conducted by changing the voltage of such intermediate electrodes 4 and 4' as shown in Table 1. In Comparative Example 1, no voltage was applied to the intermediate electrodes 4 and 4'. With respect to the magnetic layers thereby obtained, the numbers, the diameters and the average diameters of the low chromium concentration regions and the orientation ratios (intensity ratios) between the circumferential direction and the radial direction in the Co (002) plane of the crystals were obtained in accordance with the above mentioned methods. All of the magnetic layers had segregation structures wherein low chromium concentration regions were surrounded by high chromium concentration regions, and at least 95% of the surrounded low chromium concentration regions had a diameter of from 80 to 500 Å. With respect to the respective substrates after the sputtering, the coercive forces (Hc) were measured by a sample vibration type magnetometer at an applied magnetic field of 5K Oe. The results are shown in Table 1 and FIG. 1 (the relation between the number of the low chromium concentration regions and the coercive force Hc). Further, transmission electron microscopic photographs of the metal crystal structures showing the chromium segregation structures of the magnetic layers of Examples 1 to 4 and Comparative Example 1, are shown in FIGS. 7 to 11, respectively.

TABLE 1

| | Number of Low chromium concentration regions (regions/μm²) | Average diameter (Å) | Intensity ratio of the electron deffraction ring in the Co (002) plane | Coercive force (Oe) | Intermediate electrode voltage (V) |
| --- | --- | --- | --- | --- | --- |
| Example 1 | 1392 | 164 | 5.3 | 1313 | 50 |
| Example 2 | 1116 | 191 | 7.4 | 1573 | 100 |
| Example 3 | 920 | 208 | 4.6 | 1400 | 150 |
| Example 4 | 836 | 201 | 3.2 | 1225 | 200 |
| Comparative Example 1 | 136 | 304 | 1.06 | 930 | — |

Further, with respect to the magnetic layer of Example 2, the magnetic layer prior to the etching with dilute aqua regia and the remaining portions of the magnetic layer after the etching were analyzed by an energy dispersion type X-ray spectroscope (DELTA-3 Model, manufacture by KEVEX Company) to obtain the characteristic X-ray intensity ratio of Cr/Co. The analyzed regions were two spots of 50 nm in diameter prior to the etching and four spots of 10 nm in diameter after the etching, which were randomly selected. The analytical results are shown in Table 2.

TABLE 2

| | Characteristic X-ray intensity ratio of Cr/Co | | | | |
|---|---|---|---|---|---|
| Spots for measurement | 1 | 2 | 3 | 4 | Average |
| Prior to etching | 0.22 | 0.24 | — | — | 0.23 |
| After etching | 0.99 | 0.69 | 1.16 | 0.85 | 0.92 |

The remaining portions were apparently segregated regions of high chromium concentration. Further, as is evident from the electron microscopic photographs of FIGS. 7 to 11, the coercive force is improved by the structure wherein the low chromium concentration regions are surrounded by the high chromium concentration regions. From Table 1 and FIG. 1, it is further evident that there is an optimum range for the coercive force in the number of the surrounded low chromium concentration regions.

EXAMPLES 5 TO 8 AND COMPARATIVE EXAMPLES 2 AND 3

Using substrates having the arithmetric average roughness Ra of the surface in the circumferential direction varied by controlling the conditions for texturing the surface of Ni-P substrates, the relations with the orientation intensity ratio of the Co crystal (002) plane of the magnetic layer and with the anisotropy ratio of the coercive force were studied. The sputtering conditions were the same as in Example 1 except that in Examples 5 to 8, the potential of the intermediate electrodes was adjusted to +100 V, and in Comparative Examples 2 and 3, the potential of the intermediate electrodes was 0 V.

The anisotropy ratio of the coercive force was obtained as a ratio of the coercive force (Hc ∥) measured by applying the magnetic field in parallel with the texturing direction in the plane of the sample by means of a sample vibration type magnetometer to the coercive force (Hc⊥) measured by applying the magnetic field in a traversed direction to the texturing direction.

Figure 2:
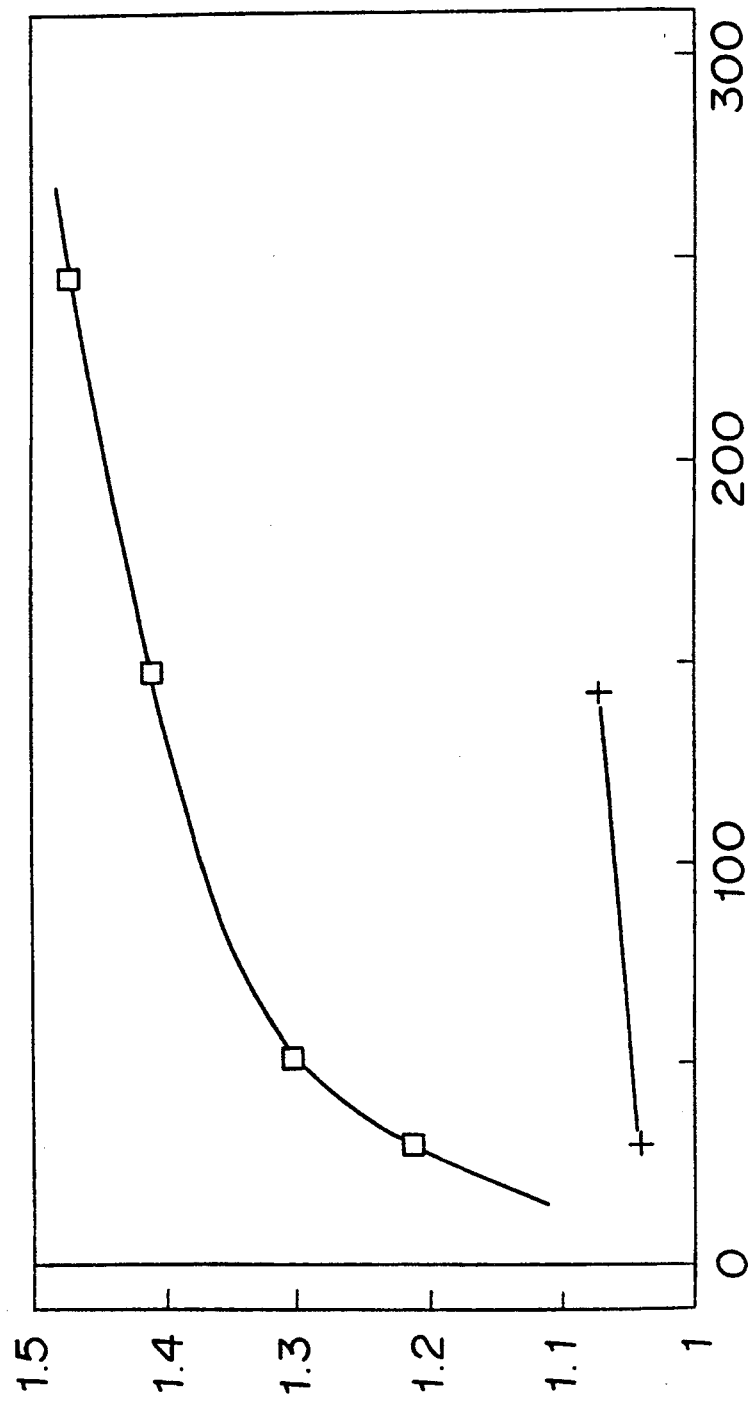
FIG. 2 is a graph showing the relation between the arithmetric average roughness Ra and the coercive force anisotropic ratio of the magnetic layer (Hc $\parallel$ /Hc$\perp$) in Examples 5 to 8 and Comparative Examples 2 and 3.
Figure 3:
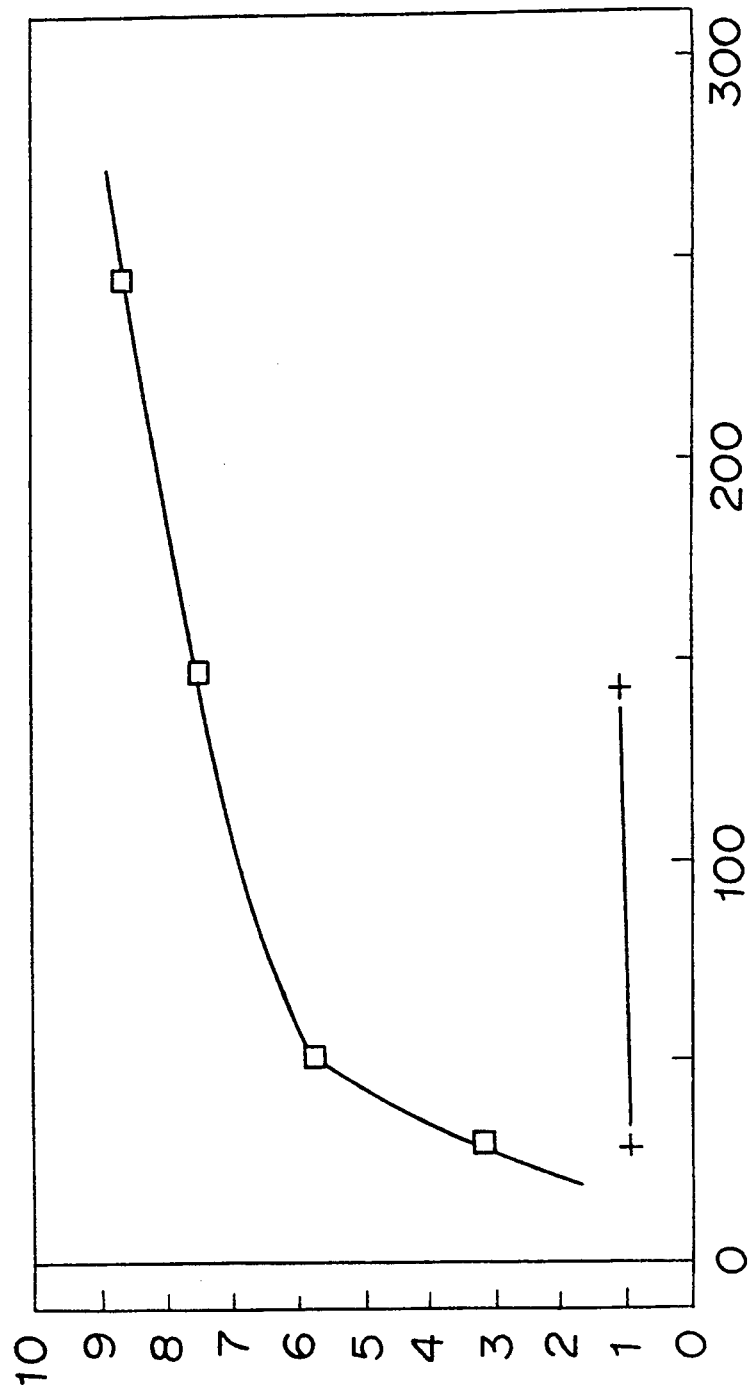
FIG. 3 is a graph showing the relation between the arithmetric average roughness Ra of the substrate and the intensity ratio between the circumferential direction and the radial direction of the electron diffraction ring in the Co (002) plane by electron diffraction of the hcp structure of the magnetic layer in Examples 5 to 8 and Comparative Examples 2 and 3.

The crystal orientation (the intensity ratio of the electron diffraction rays of the magnetic layer) was measured by the above mentioned method. The results are shown in Table 3, FIG. 2 (the view illustrating the relation between the arithmetric average roughness Ra and the anisotropy ratio of the coercive force Hc ∥ /Hc⊥), FIG. 3 (the view illustrating the relation between the arithmetric average roughness Ra and the intensity ratio of the electron diffraction rays in the Co (002) plane) and FIG. 4 (the view illustrating the relation between the intensity ratio of the electron diffraction ring in the Co (002) plane and the anisotropy ratio of the coercive force Hc ∥ /Hc⊥). Further, transmission electron microscopic photographs of the magnetic layers of Examples 5 to 8 and Comparative Example 3 are shown in FIGS. 12 to 16, respectively.

All of the magnetic layers had segregation structures in which low chromium concentration regions are surrounded by chromium concentration regions. The diameters of at least about 95% of the surrounded low chromium concentration regions, are within a range of from 80 to 500 Å, and the number of the low chromium concentration regions is from 800 to 1,000 regions/$\mu m^2$. The average diameter was from 190 to 200 Å.

TABLE 3

| | arthmetric average roughness Ra (Å) | Intensity ratio of electron deffraction ring in the Co (002) plane | Anisotropy ratio of coercive force Hc ∥ /Hc⊥ | Coercive force (Oe) |
|---|---|---|---|---|
| Example 5 | 30 | 3.12 | 1.21 | 1225 |
| Example 6 | 52 | 5.72 | 1.30 | 1355 |
| Example 7 | 149 | 7.47 | 1.41 | 1415 |
| Example 8 | 246 | 8.64 | 1.47 | 1425 |
| Comparative Example 2 | 30 | 0.94 | 1.04 | 920 |
| Comparative Example 3 | 142 | 1.06 | 1.07 | 925 |

It is evident that in Examples 5 to 8, the intensity of the electron diffraction ring in the Co (002) plane is anisotropic, whereas Comparative Examples 2 and 3 are isotropic. Further, from Table 3 and FIGS. 2 and 3, it is evident that when sputtering is conducted while applying a voltage to the intermediate electrodes, the intensity ratio of the diffraction ring between the circumferential direction and the radial direction of the substrate in the Co (002) plane of the electron diffraction increases, and the anisotropy ration of the coercive force increases. It has been found also that not only the coercive force but also the squareness ratio of the magnetic properties increases.

Figure 4:
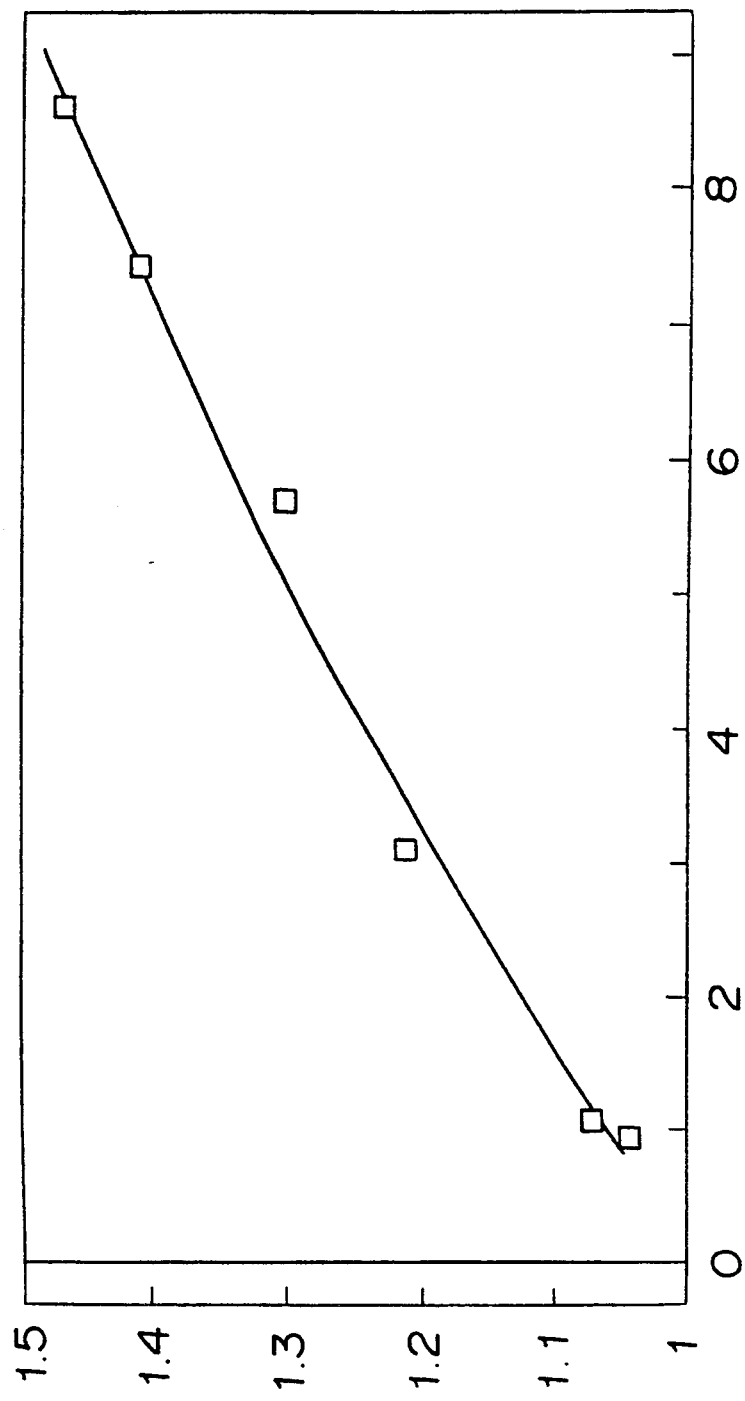
FIG. 4 is a graph showing the relation between the intensity ratio between the circumferential direction and the radial direction of the electron diffraction ring in the Co (002) plane of the magnetic layer and the coercive force anisotropic ratio (Hc $\parallel$ /Hc$\perp$) in Examples 5 to 8 and Comparative Examples 2 and 3.

From FIG. 4, it is evident that there is a distinct interrelation between the intensity ratio of the electron diffraction ring in the Co (002) plane and the anisotropy ratio of the coercive force.

A substrate having a texture with a arithmetric average roughness Ra of 240 Å in the circumferential direction, was mounted in a high frequency magnetron sputtering apparatus, and after evacuating the apparatus to a level of $1 \times 10^{-6}$ Torr, the substrate was heated to 250° C., argon gas was introduced to $5 \times 10^{-3}$ Torr and a chromium layer was formed in a thickness of 1,600 Å with a power of 8.8 W/cm². Then, a magnetic layer of $Co_{84}Cr_{16}$ atomic % was formed in a thickness of 600 Å. This magnetic layer was measured by the above mentioned method to obtain the number, the diameter and the average diameter of low chromium concentration regions and the intensity ratio of the electron diffraction ring between the circumferential direction and the radial direction in the Co crystal (002) plane. The magnetic layer had a segregation structure wherein the low chromium concentration regions were surrounded by high chromium concentration regions, and the diameters of at least about 95% of the surrounded low chromium concentration regions were within a range of from 80 to 500 Å. Further, the magnetic properties were measured by the above mentioned method. The results are shown in Table 4.

TABLE 4

| Number of low chromium concentration regions (regions/$\mu m^2$) | Average diameter (Å) | Intensity ratio of the electron diffraction in Co (002) plane | Anisotropy ratio of coercive force Hc ∥ /Hc⊥ | Coercive force (Oe) |
|---|---|---|---|---|
| 800 | 180 | 3.5 | 1.21 | 1170 |

As described in the foregoing, the magnetic recording medium of the present invention has excellent magnetic properties in the circumferential direction of the substrate which is the recording direction, and according to the present invention, it is possible to obtain a longitudinal magnetic recording medium having a high coercive force.

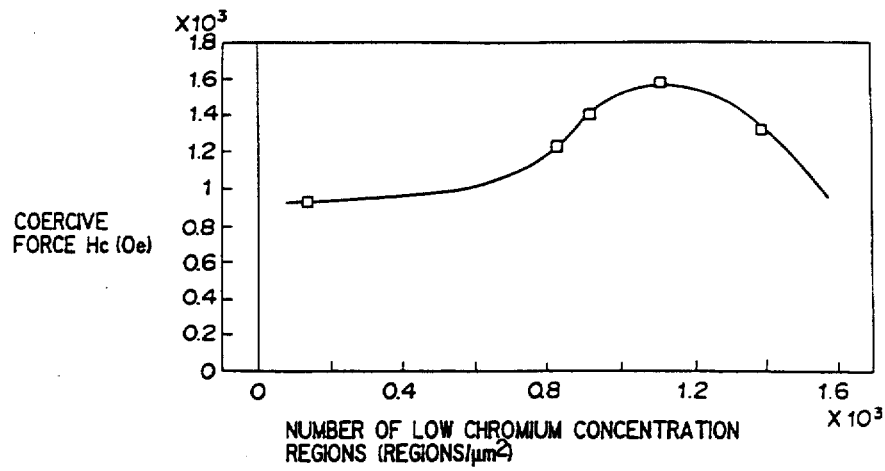

What is claimed is:

1. A longitudinal magnetic recording medium comprising a non-magnetic substrate in the form of a disk having a texture provided in a circumferential direction of the medium, with an arithmetric average roughness Ra measured in a radial direction of at least 20 angstroms, a non-magnetic chromium primer layer and a magnetic alloy layer comprising cobalt and chromium as the main components, formed on the substrate, wherein the magnetic alloy layer has (i) a feature that when an orientation degree of a hcp crystal structure is represented by diffraction ray intensity of electron diffraction by transmission electron diffractiometry, the intensity ratio of the electron diffraction ring in a Co (002) plane between the circumferential direction and the radial direction of the substrate is at least 3, and (ii) a segregation structure having cobalt chromium regions with a lower chromium concentration and a higher intensity of magnetization than surrounding cobalt chromium regions, diameters of the surrounded cobalt chromium regions being within a range of from 80 to 500 angstroms, and a number of the surrounded cobalt chromium regions being from 600 to 1,500 regions/$\mu m^2$.

2. The longitudinal magnetic recording medium according to claim 1, wherein the non-magnetic substrate has a texture with a arithmetric average roughness Ra in a radial direction of from 30 to 300 Å.

3. The longitudinal magnetic recording medium according to claim 1, wherein the non-magnetic substrate has a texture with a arithmetric average roughness Ra in a radial direction of from 50 to 300 Å.

4. The longitudinal magnetic recording medium according to claim 1, wherein the orientation degree of the hcp crystal structure of the magnetic alloy layer is such that the intensity ratio of the electron diffraction ring in the Co (002) plane between the circumferential direction and the radial direction of the substrate is at least 5.

5. The longitudinal magnetic recording according to claim 4, wherein the intensity ratio is at least 7.

6. The longitudinal magnetic recording medium according to claim 1 wherein the cobalt chromium regions with a lower chromium concentration and the surrounding cobalt chromium regions have a difference in the chromium concentration of at least 5 atomic %.

7. The longitudinal magnetic recording medium according to claim 1 wherein the chromium concentration in the cobalt chromium regions with lower chromium concentration is at most 25 atomic % and the chromium concentration in the surrounding cobalt chromium regions is at least 30 atomic %.

8. The longitudinal magnetic recording medium according to claim 1, wherein the number of surrounded cobalt chromium regions with lower chromium concentration is from 800 to 1500 regions/$\mu m^2$.

9. The longitudinal magnetic recording medium according to claim 1, wherein the chromium concentration in the magnetic alloy layer is at least 6 atomic % relative to cobalt.

10. The longitudinal magnetic recording medium according to claim 1, wherein the chromium concentration in the magnetic alloy layer is from 6 to 25 atomic % relative to cobalt.

11. The longitudinal magnetic recording medium according to claim 1, wherein the magnetic alloy layer contains additive elements selected from the group consisting of Ta, Nb, Pt, Pd, Ni, Zr, W, Mo and Hf.

12. The longitudinal magnetic recording medium according to claim 11, wherein the additive elements are less than 10 atomic % relative to cobalt and chromium.

13. The longitudinal magnetic recording medium according to claim 1, wherein the magnetic alloy layer is provided on the non-magnetic substrate having a texture with a non-magnetic primer layer having a thickness of from 500 to 2,000 Å interposed therebetween.

14. The longitudinal magnetic recording medium according to claim 1, wherein the non-magnetic substrate having a texture is an aluminum alloy plate having a Ni-P layer formed by electroless plating.

15. The longitudinal magnetic recording medium according to claim 1, wherein the non-magnetic substrate having a texture is selected from the group consisting of a metal substrate, a glass substrate, a ceramic substrate and a resin substrate.

16. The longitudinal magnetic recording medium according to claim 1, wherein the magnetic alloy layer has a thickness of from 300 to 1,500 Å.

17. The in-plane magnetic recording medium according to claim 1, wherein a protective layer and/or a lubricating layer is formed on the magnetic alloy layer.

18. The longitudinal magnetic recording medium of claim 1, wherein the magnetic alloy layer is formed by a sputtering method under such a condition that a bias potential is applied so that the non-magnetic substrate is relatively negative to a plasma potential.

19. The longitudinal magnetic recording medium of claim 18, wherein the magnetic alloy layer is formed on the non-magnetic substrate by layer-forming by a sputtering method under such a condition that a substrate potential is made relatively negative to a ground potential of a sputtering apparatus.

20. The longitudinal magnetic recording medium of claim 18, wherein the magnetic alloy layer is formed by conducting layer-forming by a sputtering method under such a condition that a plasma potential is made higher than a ground potential while maintaining the non-magnetic substrate at a level of the ground potential.

21. The longitudinal magnetic recording medium of claim 18, wherein the magnetic alloy layer is formed by providing an intermediate electrode in a vicinity of a target and conducting layer-forming under such a condition that a positive potential is applied to the intermediate electrode relative to a grounding portion of the non-magnetic substrate.

22. A longitudinal magnetic recording medium comprising a non-magnetic substrate in the form of a disk having a texture provided in a circumferential direction of the medium with an arithmetric average roughness Ra measured in a radial direction of at least 20 Å provided on an aluminum alloy plate having a Ni-P layer formed by electroless plating, and a magnetic alloy layer comprising cobalt and chromium as the main components, formed on the substrate with a non-magnetic chromium primer layer having a thickness of from 500 to 2,000 Å interposed therebetween, wherein the magnetic alloy layer has (i) a feature that when an orientation degree of a hcp crystal structure is represented by diffraction ray intensity of electron diffraction by transmission electron diffractiometry, the intensity ratio of the electron diffraction ring in a Co (002) plane between the circumferential direction and the radial direction of the substrate is at least 3, and (ii) a segregation structure having cobalt chromium regions with a lower chromium concentration and a higher intensity of magnetization than surrounding cobalt chromium regions, diameters of the surrounded cobalt chromium regions being within a range of from 80 to 500 Å, and a number of the surrounded cobalt chromium regions being from 600 to 1,500 regions/$\mu m^2$, and a protecting layer is formed on the magnetic alloy layer, and a lubricating layer is formed further thereon.

* * * * *

UNITED STATES PATENT AND TRADEMARK OFFICE
CERTIFICATE OF CORRECTION

PATENT NO. : 5,352,501  
DATED : October 4, 1994  
INVENTOR(S) : Yukihiro MIYAMOTO, et al.

Page 1 of 11

It is certified that error appears in the above-indentified patent and that said Letters Patent is hereby corrected as shown below:

On the title page, item [54] and column 1, line 4, change "CIRCUMTERENTIALLY" to -- CIRCUMFERENTIALLY--.

The title page, showing an illustrative figure, should be deleted and substitute therefor the attached title page.

Delete Drawing Sheets 1-4 and 11-15, and substitute therefor the Drawing Sheets consisting of FIGS. 1-4 and 12-16, as shown on the attached pages.

Signed and Sealed this

Twenty-sixth Day of September, 1995

Attest:

BRUCE LEHMAN

*Attesting Officer*  *Commissioner of Patents and Trademarks*

United States Patent [19]
Miyamoto et al.

[11] Patent Number: 5,352,501
[45] Date of Patent: Oct. 4, 1994

[54] LONGITUDINAL MAGNETIC RECORDING MEDIUM COMPRISING A CIRCUMFERENTIALLY TEXTURED DISK SUBSTRATE, CHROMIUM PRIMER LAYER AND A COBALT CHROMIUM MAGNETIC ALLOY LAYER HAVING A SEGREGATION STRUCTURE

[75] Inventors: Yukihiro Miyamoto; Fumiaki Yokoyama, both of Yokohama, Japan

[73] Assignee: Mitsubishi Kasei Corporation, Tokyo, Japan

[21] Appl. No.: 631,904

[22] Filed: Dec. 21, 1990

[30] Foreign Application Priority Data

Dec. 27, 1989 [JP] Japan ................................ 1-338992

[51] Int. Cl.$^5$ .............................................. G11B 5/00
[52] U.S. Cl. ............................... 428/64; 428/336; 428/409; 428/611; 428/652; 428/667; 428/680; 428/694 T; 428/694 TS; 428/694 TP; 428/694 TR; 428/694 SG; 428/694 ST; 428/694 SL; 428/900; 428/928
[58] Field of Search ............... 428/694, 900, 611, 667, 428/64, 336, 409, 611, 652, 667, 680, 694 T, 694 TS, 694 TP, 694 TR, 694 SG, 694 ST, 694 SL, 928

[56] References Cited

U.S. PATENT DOCUMENTS

| | | | |
|---|---|---|---|
| 4,786,553 | 11/1988 | Shiroshi et al. | 428/336 |
| 4,789,598 | 12/1988 | Howard et al. | 428/408 |
| 4,792,497 | 12/1988 | Suzuki et al. | 428/336 |
| 4,808,489 | 2/1989 | Abe et al. | 428/336 |
| 4,902,583 | 2/1990 | Brucker et al. | 428/665 |
| 4,929,514 | 5/1990 | Natarajan et al. | 428/611 |

FOREIGN PATENT DOCUMENTS

| | | |
|---|---|---|
| 53770 | 11/1986 | Japan . |
| 255813 | 10/1988 | Japan . |
| 2071145 | 9/1981 | United Kingdom . |

OTHER PUBLICATIONS

Patent Abstracts of Japan, Unexamined applications P field, vol. 12, No. 243, Jul. 9, 1988 The Patent Office Japanese Government p. 91 P 728 *Kokai-No. 63-34 723 (Hitachi Metals LTD).

Patent Abstracts of Japan, Unexamined applications, P field, vol. 6, No. 203, Oct. 14, 1982 The Patent Office Japanese Government p. 37 P 148 *Kokai-No. 57-109 127 (Matsushita Denki Sangyo K.K.)*.

B. J. Langland, et al., IEEE Trans. Magn., MAG-17, No. 6, p. 2547, 1981 Recording on Perpendicular Anisotropy Media Whis Ring Head.

William G. Haines, J. Appl. Phys. 55, p. 2263, 1984 Effect of atomic distribution on the saturation magnetization of cobalt–chromium film.

E. M. Rossi, et al., J. Appl. Phys. 55, p. 2254, 1984 Vacuum-deposited thin-metal-film disk.

(List continued on next page.)

*Primary Examiner*—Stevan A. Resan
*Attorney, Agent, or Firm*—Oblon, Spivak, McClelland, Maier & Neustadt

[57] ABSTRACT

A longitudinal magnetic recording medium comprising a non-magnetic substrate having a texture with a arithmetric average roughness Ra in a circumferential direction of at least 20 Å and a magnetic alloy layer comprising cobalt and chromium as the main components, formed on the substrate, wherein the magnetic alloy layer has (i) a feature that when the orientation degree of the hcp crystal structure is represented by the diffraction ray intensity of electron diffraction by transmission electron diffractiometry, the intensity ratio of the electron diffraction ring in the Co (002) plane between the circumferential direction and the radial direction of the substrate is at least 3, and (ii) a segregation structure having low chromium concentration regions surrounded by high chromium concentration regions, the diameters of the defined low chromium concentration regions being within a range of from 80 to 500 Å, and the number of the surrounded low chromium concentration regions being from 600 to 1,500 regions/$\mu m^2$.

22 Claims, 15 Drawing Sheets